US010007712B1

(12) United States Patent
Williams et al.

(10) Patent No.: US 10,007,712 B1
(45) Date of Patent: Jun. 26, 2018

(54) ENFORCING USER-SPECIFIED RULES

(75) Inventors: Matthew T. Williams, Seattle, WA (US); Howard B. Gefen, Kirkland, WA (US); Vinay P. Vaidya, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 428 days.

(21) Appl. No.: 12/544,891

(22) Filed: Aug. 20, 2009

(51) Int. Cl.
*G06F 17/30* (2006.01)

(52) U.S. Cl.
CPC .. *G06F 17/30557* (2013.01); *G06F 17/30575* (2013.01)

(58) Field of Classification Search
USPC .................................. 705/26; 707/602, 802
See application file for complete search history.

(56) References Cited

U.S. PATENT DOCUMENTS

| | | |
|---|---|---|
| 4,674,065 A | 6/1987 | Lange et al. |
| 4,773,039 A | 9/1988 | Zamora |
| 5,255,386 A | 10/1993 | Prager |
| 5,696,962 A | 12/1997 | Kupiec |
| 5,710,887 A | 1/1998 | Chelliah et al. |
| 5,721,902 A | 2/1998 | Schultz |
| 5,771,378 A | 6/1998 | Holt et al. |
| 5,828,991 A | 10/1998 | Skiena et al. |
| 5,862,321 A | 1/1999 | Lamming et al. |
| 5,870,473 A | 2/1999 | Boesch et al. |
| 5,898,825 A | 4/1999 | Eberhard |
| 5,907,824 A | 5/1999 | Tzirkel-Hancock |
| 5,953,710 A | 9/1999 | Fleming |
| 5,963,965 A | 10/1999 | Vogel |
| 6,047,268 A | 4/2000 | Bartoli et al. |

(Continued)

FOREIGN PATENT DOCUMENTS

| | | |
|---|---|---|
| EP | 1077436 2 | 2/2001 |
| EP | 1077436 A2 | 2/2001 |

(Continued)

OTHER PUBLICATIONS

Office action for U.S. Appl. No. 12/353,025, dated Oct. 24, 2011, Jesenky et al., "Generating Personalized Phrases", 25 pages.

(Continued)

*Primary Examiner* — Tsan-Yu J Huang
(74) *Attorney, Agent, or Firm* — Lee & Hayes, PLLC

(57) ABSTRACT

Described herein are techniques for employing a phrase as a unique identifier of a user and a corresponding user account. For instance, a transaction processing service may maintain multiple user accounts each associated with respective users. In addition, the transaction processing service may associate one or more unique phrases with each of these respective users and user accounts. Users may then configure rules associated with their respective user accounts to enable use of associated phrases as identifiers for storing a variety of different content in association with the phrases. Users may also configure their accounts with communication rules that instruct the transaction processing service to send pieces of content that are received with the phrase to different specified destinations. Users may also configure their accounts with preferences used by vendors to complete transactions initiated with use of a phrase.

22 Claims, 9 Drawing Sheets

(56) References Cited

U.S. PATENT DOCUMENTS

| | | | |
|---|---|---|---|
| 6,141,760 A | 10/2000 | Abadi et al. |
| 6,178,396 B1 | 1/2001 | Ushioda |
| 6,202,064 B1 | 3/2001 | Julliard |
| 6,314,419 B1 | 11/2001 | Faisal |
| 6,332,131 B1 | 12/2001 | Grandcolas et al. |
| 6,343,279 B1 | 1/2002 | Bissonette et al. |
| 6,377,965 B1 | 4/2002 | Hachamovitch et al. |
| 6,411,950 B1 | 6/2002 | Moricz et al. |
| 6,496,931 B1 | 12/2002 | Rajchel et al. |
| 6,539,481 B1 | 3/2003 | Takahashi et al. |
| 6,564,213 B1 | 5/2003 | Ortega et al. |
| 6,640,304 B2 | 10/2003 | Ginter et al. |
| 6,658,568 B1 | 12/2003 | Ginter et al. |
| 6,665,659 B1 | 12/2003 | Logan |
| 6,697,793 B2 | 2/2004 | McGreevy |
| 6,853,987 B1 | 2/2005 | Cook |
| 6,856,963 B1 | 2/2005 | Hurwitz |
| 6,892,198 B2 | 5/2005 | Perisic et al. |
| 6,988,657 B1 | 1/2006 | Singer et al. |
| 7,035,789 B2 * | 4/2006 | Abrego ............ G10L 15/197 704/1 |
| 7,076,652 B2 | 7/2006 | Ginter et al. |
| 7,136,841 B2 | 11/2006 | Cook |
| 7,184,950 B2 | 2/2007 | Weise |
| 7,191,115 B2 | 3/2007 | Moore |
| 7,197,455 B1 | 3/2007 | Sudo et al. |
| 7,213,748 B2 | 5/2007 | Tsuei et al. |
| 7,264,152 B2 | 9/2007 | Tsuei et al. |
| 7,383,224 B2 | 6/2008 | Huennekens et al. |
| 7,395,241 B1 | 7/2008 | Cook et al. |
| 7,418,444 B2 | 8/2008 | Flank et al. |
| 7,426,507 B1 | 9/2008 | Patterson |
| 7,519,590 B2 | 4/2009 | Chandrasekar et al. |
| 7,548,899 B1 | 6/2009 | Del Favero, Jr. et al. |
| 7,565,345 B2 | 7/2009 | Bailey et al. |
| 7,587,197 B2 | 9/2009 | Kimbrell |
| 7,664,831 B2 | 2/2010 | Cartmell et al. |
| 7,676,507 B2 | 3/2010 | Maim |
| 7,865,567 B1 | 1/2011 | Hendricks et al. |
| 7,912,702 B2 | 3/2011 | Bennett |
| 7,925,498 B1 | 4/2011 | Baker et al. |
| 7,991,608 B2 | 8/2011 | Johnson et al. |
| 8,037,086 B1 | 10/2011 | Upstill et al. |
| 8,131,540 B2 | 3/2012 | Marchisio et al. |
| 8,136,034 B2 | 3/2012 | Stanton et al. |
| 8,150,769 B2 | 4/2012 | Gupta et al. |
| 8,161,534 B2 | 4/2012 | Golle et al. |
| 8,166,045 B1 | 4/2012 | Mazumdar et al. |
| 8,170,954 B2 | 5/2012 | Keresman, III et al. |
| 8,266,169 B2 | 9/2012 | Bobrow et al. |
| 8,316,041 B1 | 11/2012 | Chang et al. |
| 8,316,296 B2 | 11/2012 | Paek et al. |
| 8,346,792 B1 | 1/2013 | Baker et al. |
| 8,359,190 B2 | 1/2013 | Kirshenbaum |
| 8,359,191 B2 | 1/2013 | Chen et al. |
| 8,374,871 B2 | 2/2013 | Ehsani et al. |
| 8,380,491 B2 | 2/2013 | Leacock et al. |
| 8,412,639 B2 | 4/2013 | Chau et al. |
| 8,423,349 B1 | 4/2013 | Huynh et al. |
| 8,484,016 B2 | 7/2013 | Brockett et al. |
| 8,484,089 B1 | 7/2013 | Lin et al. |
| 8,661,012 B1 | 2/2014 | Baker et al. |
| 8,799,658 B1 | 8/2014 | Sellier et al. |
| 2001/0032192 A1 | 10/2001 | Putta et al. |
| 2001/0041977 A1 | 11/2001 | Aoyagi et al. |
| 2002/0032564 A1 | 3/2002 | Ehsani et al. |
| 2002/0046169 A1 | 4/2002 | Keresman et al. |
| 2002/0095298 A1 | 7/2002 | Ewing |
| 2002/0112171 A1 | 8/2002 | Ginter et al. |
| 2002/0123973 A1 | 9/2002 | Eccles et al. |
| 2002/0188587 A1 | 12/2002 | McGreevy |
| 2002/0188621 A1 | 12/2002 | Flank et al. |
| 2003/0004716 A1 | 1/2003 | Haigh et al. |
| 2003/0061170 A1 | 3/2003 | Uzo |
| 2003/0065919 A1 | 4/2003 | Albert et al. |
| 2003/0088784 A1 | 5/2003 | Ginter et al. |
| 2003/0120846 A1 | 6/2003 | Clapper |
| 2003/0187789 A1 | 10/2003 | Karas et al. |
| 2003/0208439 A1 | 11/2003 | Rast |
| 2003/0233318 A1 | 12/2003 | King et al. |
| 2004/0030551 A1 | 2/2004 | Marcu et al. |
| 2004/0064447 A1 | 4/2004 | Simske et al. |
| 2004/0078273 A1 | 4/2004 | Loeb et al. |
| 2004/0083184 A1 | 4/2004 | Tsuei et al. |
| 2004/0098375 A1 | 5/2004 | DeCarlo, III |
| 2004/0153451 A1 | 8/2004 | Phillips et al. |
| 2004/0177120 A1 | 9/2004 | Kirsch |
| 2004/0199375 A1 | 10/2004 | Ehsani et al. |
| 2004/0254893 A1 | 12/2004 | Tsuei et al. |
| 2004/0254894 A1 | 12/2004 | Tsuei et al. |
| 2004/0260653 A1 | 12/2004 | Tsuei et al. |
| 2005/0027691 A1 | 2/2005 | Brin et al. |
| 2005/0044160 A1 | 2/2005 | McElligott |
| 2005/0050469 A1 | 3/2005 | Uchimoto et al. |
| 2005/0120108 A1 * | 6/2005 | Wisniewski ......... G06Q 10/107 709/224 |
| 2005/0131826 A1 | 6/2005 | Cook |
| 2005/0171851 A1 | 8/2005 | Applebaum et al. |
| 2005/0240536 A1 | 10/2005 | Davis et al. |
| 2005/0261988 A1 | 11/2005 | Horel et al. |
| 2006/0015484 A1 | 1/2006 | Weng et al. |
| 2006/0036539 A1 | 2/2006 | Tombroff |
| 2006/0173772 A1 | 8/2006 | Hayes et al. |
| 2006/0230022 A1 | 10/2006 | Bailey et al. |
| 2006/0253399 A1 | 11/2006 | Chatani |
| 2007/0011154 A1 | 1/2007 | Musgrove et al. |
| 2007/0022058 A1 | 1/2007 | Labrou et al. |
| 2007/0088952 A1 | 4/2007 | Hewitt et al. |
| 2007/0168469 A1 | 7/2007 | Church et al. |
| 2007/0226169 A1 * | 9/2007 | Solyanik ........... G06F 17/30144 |
| 2008/0019530 A1 | 1/2008 | Eldridge et al. |
| 2008/0040233 A1 * | 2/2008 | Wildman ............... G06Q 30/06 705/26.81 |
| 2008/0040274 A1 | 2/2008 | Uzo |
| 2008/0046366 A1 | 2/2008 | Bemmel et al. |
| 2008/0046980 A1 | 2/2008 | Peng |
| 2008/0052226 A1 | 2/2008 | Agarwal et al. |
| 2008/0082903 A1 | 4/2008 | McCurdy et al. |
| 2008/0114721 A1 | 5/2008 | Jones et al. |
| 2008/0154772 A1 | 6/2008 | Carlson |
| 2008/0162455 A1 | 7/2008 | Daga et al. |
| 2008/0168073 A1 | 7/2008 | Siegel et al. |
| 2008/0189188 A1 | 8/2008 | Morgenstern |
| 2008/0189293 A1 | 8/2008 | Strandel et al. |
| 2008/0209534 A1 | 8/2008 | Keronen et al. |
| 2008/0222711 A1 | 9/2008 | Michaelis |
| 2009/0030989 A1 * | 1/2009 | Maresh ............... G06Q 10/107 709/206 |
| 2009/0064294 A1 | 3/2009 | Cook et al. |
| 2009/0070103 A1 | 3/2009 | Beggelman et al. |
| 2009/0157513 A1 | 6/2009 | Bonev et al. |
| 2009/0192928 A1 | 7/2009 | Abifaker |
| 2009/0234876 A1 | 9/2009 | Schigel et al. |
| 2009/0282035 A1 | 11/2009 | Ferreira et al. |
| 2009/0293110 A1 | 11/2009 | Koga |
| 2009/0326953 A1 | 12/2009 | Peralta Gimenez et al. |
| 2009/0327244 A1 | 12/2009 | Rizal |
| 2010/0031043 A1 | 2/2010 | Burger et al. |
| 2010/0032192 A1 | 2/2010 | Kishi |
| 2010/0083103 A1 | 4/2010 | Paek et al. |
| 2010/0138397 A1 | 6/2010 | Li et al. |
| 2010/0146115 A1 | 6/2010 | Bezos |
| 2010/0146283 A1 | 6/2010 | Poitier et al. |
| 2010/0161314 A1 | 6/2010 | Karttunen et al. |
| 2010/0179801 A1 | 7/2010 | Huynh et al. |
| 2010/0250130 A1 | 9/2010 | Wiegand et al. |
| 2010/0312778 A1 | 12/2010 | Lu et al. |
| 2011/0131157 A1 | 6/2011 | Iyer et al. |
| 2011/0153854 A1 | 6/2011 | Chickering |
| 2011/0154456 A1 | 6/2011 | Machani |
| 2011/0225417 A1 | 9/2011 | Maharajh et al. |
| 2012/0072404 A1 | 3/2012 | Murphy et al. |

(56) References Cited

U.S. PATENT DOCUMENTS

| | | |
|---|---|---|
| 2013/0198084 A1 | 8/2013 | Agarwal et al. |
| 2013/0204789 A1 | 8/2013 | Agarwal et al. |
| 2013/0204790 A1 | 8/2013 | Agarwal et al. |

FOREIGN PATENT DOCUMENTS

| | | |
|---|---|---|
| JP | H11265413 A | 9/1999 |
| JP | 2001357202 A | 12/2001 |
| JP | 2002163579 A | 6/2002 |
| JP | 2002197024 A | 7/2002 |
| JP | 2003308437 A | 10/2003 |
| JP | 2004005515 A | 1/2004 |
| JP | 2004240764 A | 8/2004 |
| JP | 2005018265 A | 1/2005 |
| JP | 2006040235 A | 2/2006 |
| WO | WO2004006194 A1 | 1/2004 |
| WO | WO2005109268 A1 | 11/2005 |
| WO | WO2008025037 A2 | 2/2008 |

OTHER PUBLICATIONS

Office action for U.S. Appl. No. 12/353,184, dated Nov. 28, 2011, Gefen et al., "Using Phrase Tokens for Performing Transactions", 19 pages.
Utility U.S. Appl. No. 11/548,111, filed Oct. 10, 2006, entitled "Utilizing Phrase Tokens in Transactions" Agarwal, et al.
Utility U.S. Appl. No. 12/331,894, filed Dec. 10, 2008, entitled "Content Sharing" Jeffrey P. Bezos.
Utility U.S. Appl. No. 12/352,970, filed Jan. 13, 2009, entitled "Generating and Suggesting Phrases" Jesensky, et al.
U.S. Appl. No. 12/353,025, filed Jan. 13, 2009, Jesensky, et al., "Generating Personalized Phrases".
U.S. Appl. No. 12/353,059, filed Jan. 13, 2009, Jesensky, et al., "Generating Mined Phrases".
U.S. Appl. No. 12/353,091, filed Jan. 13, 2009, Jesensky, et al., "Generating Constructed Phrases".
U.S. Appl. No. 12/353,120, filed Jan. 13, 2009, Huynh, et al., "Filtering Phrases".
U.S. Appl. No. 12/353,155, filed Jan. 13, 2009, Huynh, et al., "Filtering Phrases".
U.S. Appl. No. 12/353,170, filed Jan. 13, 2009, Huynh, et al., "Phrase Feedback Loop".
U.S. Appl. No. 12/353,184, filed Jan. 13, 2009, Gefen, et al., "Using Phrase Tokens for Performing Transactions".
"Amazon.com: What are Statistically Improbable Phrases?", retrieved on Dec. 15, 2008 at <<http://www.amazon.com/gp/search-inside/sipshelp.html>>, Amazon.com, 1 page.
Brown, et al., "Class-Based n-gram Models of Natural Language", MIT Press, Computational Linguistics, vol. 18, Issue 4, Dec. 1992, pp. 467-479.
"Google Sets", retrieved on Dec. 15, 2008 at <<http://labs.google.com/sets>>, Google, 1 page.
"Statistically Improbable Phrases" retrieved on Dec. 15, 2008 at <<http://en.wikipedia.org/wiki/Statistically_Improbable_
Phrases>>, Wikipedia, the free encyclopedia, 2 pages.
"What are Amazon.com Statistically Improbable Phrases?", retrieved on Dec. 15, 2008 at <<http://www.amazon.com/gp/search-inside/sipshelp-dp.html>>, Amazon.com, 1 page.
U.S. Appl. No. 61/021,275, filed Jan. 15, 2008, Rode, et al., "Systems and Methods of Retrieving Information".
Evernote.com, retrieved on Jul. 21, 2009 at <<http://evernote.com/>>, 5 pgs.
Non-Final Office Action for U.S. Appl. No. 12/353,091, dated Dec. 8, 2011, James Jesensky et al., "Generating Constructed Phrases", 18 pages.
Office action for U.S. Appl. No. 12/353,184, dated Jul. 6, 2012, Gefen et al., "Using Phrase Tokens for Performing Transactions", 20 pages.

Non-Final Office Action for U.S. Appl. No. 12/544,891, dated May 24, 2012, Matthew T. Williams et al., "Enforcing User-Specified Rules", 17 pages.
Non-Final Office Action for U.S. Appl. No. 12/353,170, dated May 25, 2012, Steve Huynh et al., "Phrase Feedback Loop", 40 pages.
Non-Final Office Action for U.S. Appl. No. 12/715,780, dated Jun. 19, 2012, Laurent E. Sellier et al., "Sharing Media Items with Pass Phrases", 46 pages.
Office action for U.S. Appl. No. 12/352,970, dated Jun. 27, 2012, Jesensky et al., "Generating and Suggesting Phrases", 34 pages.
Final Office Action for U.S. Appl. No. 12/353,091, dated Jun. 7, 2012, James Jesensky et al., "Generating Constructed Phrases", 18 pages.
Non-Final Office Action for U.S. Appl. No. 12/353,059, dated Jul. 13, 2012, James Jesensky et al, "Generating Mined Phrases", 37 pages.
Non-Final Office Action for U.S. Appl. No. 12/353,120, dated Jul. 19, 2012, Steve Huynh et al., "Filtering Phrases", 63 pages.
Non-Final Office Action for U.S. Appl. No. 12/353,155, dated Aug. 1, 2012, Steve Huynh et al., "Determining Phrases Related to Other Phrases", 29 pages.
Office action for U.S. Appl. No. 12/353,170, dated Sep. 14, 2012, Huynh et al., "Phrase Feedback Loop", 48 pages.
Office Action for U.S. Appl. No. 12/353,091, dated Apr. 9, 2014, James Jesensky, "Generating Constructed Phrases", 21 pages.
Final Office Action for U.S. Appl. No. 12/510,761, dated Jun. 4, 2014, James Jesensky, "Determining Similar Phrases", 25 pages.
Office action for U.S. Appl. No. 12/353,184, dated Oct. 3, 2014, Gefen et al., "Using Phrase Tokens for Performing Transactions", 28 pages.
Office action for U.S. Appl. No. 12/353,025, dated Sep. 10, 2014, Jesensky et al., "Generating Personalized Phrases", 22 pages.
Office Action for U.S. Appl. No. 12/353,170, dated Mar. 2, 2015, Steven Huynh, "Phrase Feedback Loop", 12 pages.
Final Office Action for U.S. Appl. No. 12/353,025, dated Apr. 28, 2015, James Jesnsky, "Generating Personalized Phrases", 12 pages.
Final Office Action for U.S. Appl. No. 12/414,236, dated Jan. 30, 2015, Rajendra Kumar Vippagunta, "Querying for User Account Information", 18 pages.
Office action for U.S. Appl. No. 12/414,236, dated Oct. 12, 2012, Vippagunta et al., "Querying for User Account Information", 15 pages.
Non-Final Office Action for U.S. Appl. No. 11/548,111, dated Oct. 20, 2014, Amit D. Agarwal, "Utilizing Phrase Tokens in Transactions", 24 pages.
Final Office Action for U.S. Appl. No. 11/548,111, dated Nov. 13, 2009, Amit D. Agarwal, "Utilizing Phrase Tokens in Transactions", 26 pages.
Non-Final Office Action for U.S. Appl. No. 12/414,236, dated Dec. 8, 2011, Rajendra Kumar Vippagunta et al., "Querying for User Account Information", 12 pages.
Non-Final Office Action for U.S. Appl. No. 11/548,111, dated Apr. 2, 2009, Amit D. Agarwal, "Utilizing Phrase Tokens in Transactions", 21 pages.
Office Action for U.S. Appl. No. 14/312,924, dated May 7, 2015, Laurent E. Sellier, "Sharing Media Items With Pass Phrases", 51 pages.
Office action for U.S. Appl. No. 12/510,761, dated May 8, 2015, Jesensky et al., "Determining Similar Phrases", 24 pages.
Final Office Action for U.S. Appl. No. 12/353,184, dated Jun. 16, 2015, Howard B. Gefen, "Using Phrase Tokens for Performing Transactions", 29 pages.
Office action for U.S. Appl. No. 12/414,236, dated Jul. 8, 2014, Vippagunta et al., "Querying for User Account Information", 14 pages.
PCT International Search Report and Written Opinion for PCT Application No. PCT/US07/76920 dated May 2, 2008, 13 pages.
Riloff et al., "Learning Extraction Pattern for Subjective Expressions", Proceedings of the 2003 Conference on Empirical Methods in Natural Language Processing, 2003, 8 pages.
Final Office Action for U.S. Appl. No. 11/548,111, dated Jun. 17, 2015, Amit D. Agarwal, "Utilizing Phrase Tokens in Transactions", 20 pages.

(56) References Cited

OTHER PUBLICATIONS

Office action for U.S. Appl. No. 12/414,236, dated Sep. 21, 2015, Vippagunta et al., "Querying for User Account Information", 23 pages.
Office action for U.S. Appl. No. 12/353,170, dated Sep. 24, 2015, Huynh et al., "Phrase Feedback Loop", 10 pages.
Office Action for U.S. Appl. No. 13/829,435, dated Oct. 7, 2015, Agarwal et al., "Utilizing Phrase Tokens in Transactions", 21 pages.
Office Action for U.S. Appl. No. 13/828,841, dated Oct. 8, 2015, Agarwal et al., "Utilizing Phrase Tokens in Transactions", 19 pages.
Othce Action for U.S. Appl. No. 12/353,025, dated Mar. 18, 2016, Jessensky et al., "Generating Personalized Phrases", 29 pages.
Office Action for U.S. Appl. No. 12/414,236, dated Jun. 2, 2016, Vippagunta et al., "Querying for User Account Information", 17 pages.
Office action for U.S. Appl. No. 12/353,184, dated Sep. 9, 2016, Gefen et al., "Using Phrase Tokens for Performing Transactions", 43 pages.
Office action for U.S. Appl. No. 12/414,236, dated Nov. 2, 2016, Vippagunta et al., "Querying for User Account Information", 19 pages.
Office action for U.S. Appl. No. 12/353,170, dated Jan. 12, 2017, Huynh et al., "Phrase Feedback Loop", 12 pages.
Office action for U.S. Appl. No. 12/353,025, dated Feb. 9, 2017, Jessensky et al., "Generating Personalized Phrases", 27 pages.
Office action for U.S. Appl. No. 12/353,184, dated Mar. 24, 2017, Gefen et al., "Using Phrase Tokens or Performing Transactions", 44 pages.
Allan, et al., "Using Part-of-speech Patterns to Reduce Query Ambiguity", Proceedings of the 25th annual international ACM SIGIR conference on Research and development in information retrieval (SIGIR'02), ACM, New York, NY, Aug. 2002, pp. 307-314.
Jones, et al., "Generating Query Substitutions", WWW 2006, Edinburgh, Scotland, ACM, May 2006, pp. 387-396.
Office Action for U.S. Appl. No. 12/510,761, dated Nov. 19, 2013, James Jesensky, "Determining Similar Phrases", 19 pages.
Office action for U.S. Appl. No. 12/715,780, dated Dec. 2, 2013, Sellier, et al., "Sharing Media Items with Pass Phrases", 49 pages.
Wang, et al., "Mining Term Association Patterns from Search Logs for Effective Query Reformulation", CIKM'08, Napa Valley, CA, USA, ACM, Oct. 2008, pp. 479-488.
U.S. Appl. No. 12/510,761, filed Jul. 28, 2009, Jesensky, et al., "Determining Similar Phrases".
U.S. Appl. No. 12/715,780, filed Mar. 2, 2010, Sellier, et al, "Sharing Media Items with Pass Phrases".
Office action for U.S. Appl. No. 12/715,780, dated Jul. 10, 2013, Sellier et al., "Sharing Media Items with Pass Phrases", 46 pages.
Office action for U.S. Appl. No. 12/715,780, dated Jan. 11, 2013, Sellier et al., "Sharing Media Items with Pass Phrases", 44 pages.
Office action for U.S. Appl. No. 12/352,970, dated Jan. 16, 2013, Jesensky et al., "Generating and Suggesting Phrases for a User", 25 pages.
Office action for U.S. Appl. No. 12/353,059, dated Jan. 24, 2013, Jesensky et al., "Mining Phrases for Association With a User", 39 pages.
Office action for U.S. Appl. No. 12/353,155, dated Jan. 29, 2013, Huynh et al., "Determining Phrases Related to Other Phrases", 35 pages.
Office Action for U.S. Appl. No. 12/353,170, dated Jul. 12, 2017, Steven Huynh, "Phrase Feedback Loop", 12 pages.

\* cited by examiner

ENFORCING USER-SPECIFIED RULES

RELATED APPLICATIONS

This application is related to U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS and both incorporated herein by reference in their entirety.

BACKGROUND

Users employ computing devices to conduct an array of different transactions. For instance, users employ computing devices to purchase items from vendors, to send emails or text messages, to log in to user accounts and to accomplish a vast array of other tasks. With this in mind, businesses and other entities continually strive to improve the ease and convenience of these user transactions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
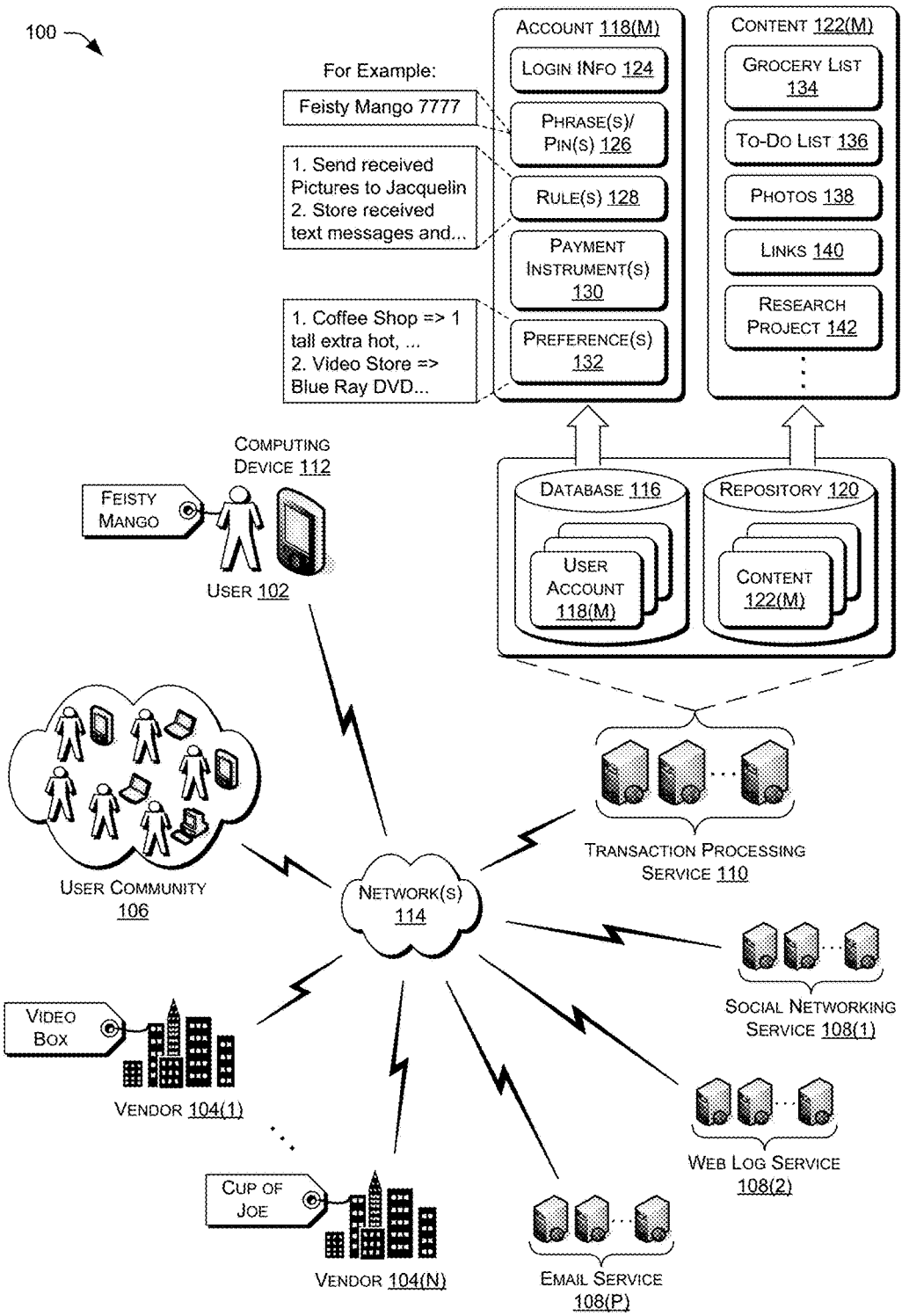
FIG. 1 illustrates an example architecture in which a transaction processing service maintains a user account associated with a unique phrase for a particular user. As described below, the user may conduct transactions with the transaction processing service, vendors and/or other entities with use of the unique phrase.

This disclosure is directed, in part, to employing a phrase as a unique identifier for a user and a corresponding user account. For instance, a transaction processing service may maintain multiple user accounts each associated with respective users. In addition, the transaction processing service may associate one or more unique phrases with each of these respective users and user accounts. These phrases may comprise a string of alphanumeric characters and, in some instances, may comprise two or more grammatically correct words. In some instance, these phrases comprise transaction phrase tokens, as described in U.S. Provisional Application No. 60/823,611 and U.S. patent application Ser. No. 11/548,111, both incorporated by reference above.

As these related applications describe, a user may choose which phrase(s) to associate with an account of the user. For instance, an avid bicyclist may select a phrase "Ride On," while an admirer of dogs may select a phrase "Dog Lover." In addition or in the alternative, the transaction processing service or another entity may suggest phases to users, based at least in part on personal characteristics known by the service (via the user accounts) or otherwise. In each of these instances, the transaction processing service may associate one or more phrases with respective users and user accounts.

In addition, each user may configure their respective user accounts so as to enable these users to employ their respective phrases for a variety of different purposes. For instance, a user may configure his or her user account to serve as a repository of content that is sent to the user account along with a unique phrase of the user. For instance, in one example a user may select (and the transaction processing service may associate) a phrase "Feisty Mango" to the user and a corresponding user account. The user may then set up a variety of rules in association with this phrase and with the user's account at the transaction processing service. For instance, the user may direct the transaction processing service to store content that is received at the transaction processing service and is accompanied by the phrase "Feisty Mango."

After doing so, the user and/or other users may then send various content or identifications of content to the transaction processing service along with the phrase "Feisty Mango." In response, the transaction processing service may store the received content (or the identified content) in association with the phrase. By doing so, the user may then access the user's account at a later time and view any content stored in association with the phrase.

For instance, a user may send a digital image, a web page, a short messaging service (SMS) text message, an email or any other similar or different piece of content to the transaction processing service along with the phrase "Feisty Mango." The transaction processing service may then store this content in association with the received phrase. Thus, the user may (at a later time) request access to the user's account at the transaction processing service (e.g., with use of a valid user name and password) in order to view this array of content stored in association with the phrase "Feisty Mango."

In some instances, a user may configure the user's account with various categories for storing content. For instance, a user may create categories entitled "to do list," "grocery list," "pictures, "research project," and the like. Therefore, when the user later sends content to the transaction processing service for storage in association with the phrase "Feisty Mango," the user may also identify the category in which the transaction processing service should store the content. For instance, a user could send an SMS text message to the transaction processing service with the following message: "Feisty Mango grocerylist=add 1 apple" (or a similar message). In response, the transaction processing service may add one apple to the stored grocery list associated with the user and with the phrase "Feisty Mango." The user may periodically send similar messages to the transaction processing service to add to or delete from the user's grocery list. The user may then later access this list to retrieve the user's stored grocery list.

In addition or in the alternative, the user may set up the corresponding user account with one or more communication rules. These rules may specify that when a user sends a piece of content to the transaction processing service along with the phrase, the transaction processing service should forward the piece of content and/or another communication to one or more specified destinations. For instance, the user may create a rule specifying that when the transaction processing service receives an image file (e.g., a digital photograph) along with the phrase "Feisty Mango," the service should not only store the picture in association with the phrase but should also forward the picture onto a specified email address. In some instances a user may send an identification of a piece of content (e.g., a URL address) to the transaction processing service along with the phrase, and the service may send the identified content (e.g., the web page referenced by the URL address) to the specified destination(s).

In still other instances, the user may set up certain rules and/or preferences in association with the user's phrase for use in conducting one or more transactions with one or more vendors. That is, a user may configure an account of the user such that when the user sends a predetermined command to the transaction processing service, the transaction processing service requests performance of a service from a specified vendor. For instance, the user may configure the user's account such that when the user sends a message (e.g., an email, an SMS text message, etc.) comprising the phrase "Feisty Mango" and a specified command (e.g., "Latte"), the transaction processing service will send a request to a user-specified coffee shop for a latte. Again, the user may pre-specify preferences that the transaction processing service should request. In the instant example, the user may specify that the transaction processing service should request a tall, extra hot, extra foam vanilla latte in response to receiving the message comprising "Feisty Mango latte." In addition, in instances where the phrase is associated with a payment instrument of the user, the transaction processing service may prepay for the requested service (here, the latte) with use of the payment instrument.

By configuring the user account in this manner, the user may be able to send a message (e.g., an SMS text message) comprising the phrase and a command to the transaction processing service for sending the command to the appropriate vendor. In the instant example, the user may send an SMS text message stating "Feisty Mango late" and, shortly thereafter, may pick up a prepaid latte made exactly according to the preferences of the user at the specified coffee shop.

The discussion begins with a section entitled "Transaction Phrase Tokens," that briefly describes certain aspects of the transaction phrase tokens that may be used with the techniques described herein. Next, a section entitled "Illustrative Architecture" follows and describes a non-limiting environment in which a user may configure a user account associated with a phrase to enforce user-specified rules when the user conducts transactions with the phrase. The discussion then moves on to discuss "Illustrative Flow Diagrams" for implementing the described techniques in the architecture of FIG. 1 or otherwise, before ending with a brief conclusion.

This brief overview, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Transaction Phrase Tokens

As discussed above, a user may select a phrase for association with a user account and, in response, a transaction processing service that maintains the user account may associate the phrase with the user account. In some instances, this phrase comprises a transaction phrase token as discussed above and as described in detail in the applications incorporated by reference above. A transaction phrase token may comprise a set of numeric or alphanumeric characters that has a secondary meaning to the user (e.g., "Grace's Textbooks," "Griffin's Utility Bills," "Tanner's Allowance," etc.) or may simply comprise a string of two or more words (e.g., "Perceived Lumberjack," "Beautiful Summer Morning," "Feisty Mango," etc.). In some instances, each of these phrases may comprise between two and seven words, and may be free of numbers, symbols and the like. As such, these phrases may comprise a number of grammatically-correct words that may or may not be separated from one another by a space.

In some instances, a user may request creation of a transaction phrase token for the user's own use. That is, the user may link his or her payment instrument to a phrase token, such as "My Fun Cash," and may then use the transaction phrase token to purchase or otherwise consume services or items. In other instances, a first user may request creation of a token that is for use by a second user. For instance, a father may create a transaction phrase token for his son, Griffin, entitled "Griffin's Utility Bills." The father may then set rules about how Griffin may and may not use the transaction phrase token. For instance, the father could set a monthly allowance for the transaction phrase token or could specify that the token may only be used to pay for utility bills from specific vendors (and, hence, cannot be used to purchase other services or items).

In both instances, a user of a created transaction phrase token may use the phrase token to conduct transactions (e.g., to purchase or otherwise consume services or items offered for sale or consumption). For instance, the user could purchase, give, or receive a service or item with the use of the transaction phrase token, or the user could similarly engage in any other sort of transaction with use of the token, as discussed in detail in the sections that follow.

In some instances, a transaction phrase token that is associated with an aspect of a user account is free from information identifying the aspect of the user account. For instance, the transaction phrase token "Griffin's Utility Bills" may be associated with a payment instrument, yet may be free from information identifying the payment instrument. Therefore, the user associated with the phrase may more freely share the phrase than an actual identifier of the payment instrument. That is, the user may more freely share the phrase "Griffin's Utility Bills" when compared with the sharing of the underlying payment instrument (e.g., a credit card number, bank account number, gift card number, etc.).

In addition to being associated with one or more aspects of a user account (e.g., payment instrument, shipping address, etc.), a transaction phrase token may have other characteristics. For instance, a transaction phrase token may be assigned one or more rules specifying how the token may be used. To illustrate, envision that a particular user account is associated with the transaction phrase token entitled "Griffin's Utility Bills." Envision also that the father has assigned a monthly balance of $200 to this transaction phrase token for use with specified utility vendors (e.g., the heating company, the electric company, etc.). Therefore, a user of the phrase token (e.g., the son, Griffin) may use the token to pay for utility services until the total usage for that month reaches $200.

Illustrative Architecture

FIG. 1 illustrates an example architecture 100 in which a user 102 may conduct transactions with one or more vendors 104(1), 104(2), . . . , 104(N), with a community of users 106 and/or with a variety of different services 108(1), 108(2), . . . , 108(P) with use a phrase or another identifier, such as a mobile telephone number. User 102 may conduct transactions either directly with vendors 104(1)-(N) (e.g., brick-and-mortar retailers, e-commerce sites, etc.), community 106 and services 108(1)-(P) or via a transaction processing service 110. In some instances, user 102 may use a computing device 112 to configure an account of user 102 at transaction processing service 110 with customized rules such that transaction processing service 110 enforces these rules upon receipt of a message that specifies the phrase or other identifier associated with user 102.

In the illustrated embodiment, the techniques are described in the example context of user 102 operating computing device 112 to access transaction processing service 110 over a network 114. Network 114 may include any one or combination of multiple different types of networks, such as cable networks, the Internet, and wireless networks. User computing device 112, meanwhile, may be implemented as any number of computing devices, including as a personal computer, a laptop computer, a portable digital assistant (PDA), a mobile phone, a set-top box, a game console, a personal media player (PMP), and so forth.

Transaction processing service 110 may include one or more processors and memory executable on the processor(s). This memory may store or otherwise have access to a database 116 storing information about one or more user accounts 118(1), 118(2), . . . , 118(M). Each of user accounts 118(1)-(M) is associated with a respective user, such as user 102, and may include an array of information associated with the account, including one or more phrases and additional information described in detail below. In addition, each user account may include any rules that the respective user 102 has previously provided to the transaction processing service 110.

These rules may, for instance, direct transaction processing service 110 to store content that service 110 receives from user 102 (or from another entity) in a content repository 120. As illustrated, transaction processing service 110 stores or otherwise has access to content repository 120 storing content 122(1), 122(2), . . . , 122(M) associated with respective user accounts 118(1)-(M). In some instances, service 110 stores this content when user 102 sends a message to service 110 including the content to be stored and the phrase of the user (here, "Feisty Mango").

In addition or in the alternative, the rules associated with user account 118(M) may specify that when transaction processing service 110 receives a message from user 102, service 110 should forward the message or other content to one or more specified destinations, such as vendors 104(1)-(N), community 106 and/or services 108(1)-(P). For instance, the user may specify that when service 110 receives an email message specifying the phrase "Feisty Mango," service 110 should forward the communication as an SMS text message to a phone of user 102.

Furthermore, the rules associated with user account 118(M) may specify information used to conduct a transaction with one or more of vendors 104(1)-(N). For instance, user 102 may configure a rule that causes transaction processing service 110 to order an item (e.g., a latte) from vendor 104(N) (e.g., a coffee ship) upon receipt of the phrase "Feisty Mango" (possibly in addition to a request, such as the term "latte").

To accomplish these tasks, user 102 and transaction processing service 110 may store a variety of information in user account 118(M). This information may include login information 124 of user 102, one or more phrases (and corresponding passwords or PINS) 126 associated with user 102, one or more rules 128, one or more payment instruments 130 and one or more preferences 132. In some instances, user account 118(M) may include a multitude of additional information, such as shipping and/or billing addresses of user 102, a digital location at which user 102 prefers to download digital content objects to, as well as any other similar or different information.

Login information 124 may comprise a user name and password that, when provided by user 102, allows user 102 to access user account 118(M). Phrases 126, meanwhile, may comprise phrases that are associated with user account 118(M) and, hence, may be used as identifiers of user 102 and/or user account 118(M). In some instances, each phrase is associated with a password or personal identification number (PIN) for purposes of authenticating a user that uses the corresponding phrase. For instance, the phrase "Feisty Mango" associated with user account 118(M) is associated with a PIN of "7777." As such, when user 102 employs phrase 126, the user may use the PIN of 7777 to authenticate or otherwise prove that the user has the authority to use the phrase.

Rules 128, meanwhile, may comprise any of the rules discussed above, as well as in U.S. Provisional Application No. 60/823,611 and U.S. patent application Ser. No. 11/548,111 (both incorporated by reference above). For instance, rules 128 may include one or more storage or communication rules that instruct transaction processing service 110 to take certain actions upon receiving a message from user 102 that includes phrase 126 (potentially along with the corresponding PIN) as well as a piece of content. For instance, one example user-specified rule may instruct service 110 to send any pictures received with the phrase "Feisty Mango" to one or more specified destinations, such as a mobile phone, an email address, destination(s) associated with another phrase of another user account 118(1)-(M) or any other destination.

In the illustrated example, user 102 may have specified that service 110 should send received pictures to a mobile phone of another user (here, named "Jacquelin"). As such, user 102 knows that if user 102 sends a picture from a mobile phone of user 102 and via a multimedia messaging service (MMS) message to transaction processing service 110 along with the phrase "Feisty Mango," then service 110 will forward the picture to a mobile phone number of the other user, Jacquelin. Another example rule, meanwhile, may instruct service 110 to store each text message that is sent to the phrase "Feisty Mango" in content folder 122(M) associated with user account 118(M). This rule may also instruct service 110 to send the content of each text message as an email to an email account specified by user 102 and maintained by email service 108(P).

In yet another example, user 102 may specify that each message sent to transaction phrase service 110 that includes the phrase "Feisty Mango" as well as the PIN "7777" (thus authenticating the user) should be sent to social networking service 108(1) as well as a web log service 108(2), possibly in addition to a micro-blog service and/or any other service. Social networking service 108(1) may maintain a social networking site that includes user accounts, including a user account associated with user 102. Web log service 108(2), meanwhile, may maintain web logs ("blogs") or journals associated with the different users, including user 102. As such, transaction processing service 110 may enable user 102 to create a rule described immediately above. Once created, this allows user 102 to send a single message (e.g., an email, an SMS text message, etc.) to service 110 that will send this same message to services 108(1) and 108(2). User 102 thus knows that the user may post messages or update a status of the user on some or all of these services by simply sending a single message to transaction processing service 110.

In yet another example, user 102 may create a rule that instructs transaction processing service 110 to send certain information to a network address associated with a global positioning system (GPS) device of user 102. Service 110 may send this information to the GPS device in response to receiving a physical address along with phrase 126 and the corresponding PIN. After configuring such a rule, user 102 may send a message to service 110 containing the phrase "Feisty Mango" along with the PIN "7777" and an address (e.g., 12345 S. Griffin St, Liberty Lake, Wash. 99019). In response, service 110 may send this address to the GPS device of user 102, which in the instant example may reside in a vehicle of user 102. As such, user 102 is now able to navigate to this location with use of the GPS device after simply sending a text message with the desired address along with the user's phrase and PIN to service 110.

Transaction processing service 110 may also allow user 102 to configure how this user would like to receive communications from other users that send messages to the phrase "Feisty Mango." These rules may comprise conditional rules that are based on one or more factors, such as a time of day at which the message is received, an originator of the message and the like. For instance, user 102 may create a rule that instructs service 110 to send an email to a specified email address of user 102 and a text message to a specified mobile phone of user 102 in response to transaction processing service 110 receiving a text message between the hours of 7 am and 10 pm and containing the phrase "Feisty Mango." For text messages received after 10 pm and before 7 am, meanwhile, this rule may instruct service 110 to send an email but refrain from sending a text message.

As such, envision that another user sends the following text message at 11 am to a short code associated with transaction processing service 110: "Feisty Mango meet at library 1 pm." In response to receiving this message, service 110 may send the following message as a text message and an email to user 102: "meet at library 1 pm from number: <xxx-xxx-xxxx>" (with service 110 including the mobile phone number from which the message was received).

In addition or in the alternative, a user that sends a message to transaction processing service for forwarding to user 102 may define how service 110 should provide this message user 102. In the example discussed immediately above, for instance, the sending user may send the following text message to service 110: "Feisty Mango meet at library 1 pm, *send text and email." This message includes a command instructing service 110 to relay the message to user 102 by sending an email and a text message to user 102.

In addition to enabling users to effectively disperse received and sent communications, these techniques also maintain an amount of privacy for user 102. Specifically, user 102 may share the phrase of the user ("Feisty Mango") without sharing an email address, a mobile phone number and/or other information of user 102 that the phrase maps to. As such, user 102 is able to pass out a phrase of the user and, by doing so, selectively keep the user's more personal information private while still receiving emails, text messages, voicemails and the like.

The techniques may also create a level of convenience for user 102, as this phrase may map to important information associated with user 102, such as an email address, a phone number, a home address, a work address and the like. As such, user 102 may simply provide the user's phrase rather than provide a mobile phone number of the user, an address of the user or any other information in response to receiving a request for that information. To illustrate, envision that user 102 uses computing device 112 to navigate to a site that requests shipping and billing addresses of user 102. Here, user 102 may provide phrase 126 to the site, which may in turn request the address information from transaction processing service 110. As such, user 102 only needed to provide the phrase "Feisty Mango" rather than the entire shipping and billing addresses of user 102. This may also reduce the chance of data-entry error.

In addition to maintaining phrase 126 for the purposes discussed above, transaction processing service may also create an email address managed by service 110 and associated with phrase 126. For instance, service 110 may create an email address for each phrase of each user (such as user 102) that is associated with one or more phrases as described above. These email addresses may comprise or consist of the phrase itself in addition to a domain managed by transaction processing service 110. In the instant example, service 110 may create and manage an email address of "FeistyMango@TPS.com" for user 102. User 102 may then disperse this email address to his friends, family or any other users. In addition, user 102 may create any of the rules discussed above. For instance, user 102 may direct that emails received at this address from certain users should be converted to text messages and sent to a specified mobile phone of user 102. Additionally or alternatively, user 102 may create a rule that instructs service 110 to reject emails from certain other specified individuals. User 102 may additionally or alternatively create any other similar or different rules.

As discussed above, user 102 may also configure user account 118(M) with a storage rule that effectively makes transaction processing service 110 a content repository for user 102 with use of phrase 126. For instance, a user could create a rule that requests that service 110 store certain types of (or all) content received along with the phrase "Feisty Mango." In some instances, service 110 may store all of this content 122(M) (associated with user account 118(M)) in a common location or folder. In other instances, meanwhile, service 110 may allow user 102 to create different locations or folders for storing received content.

In the illustrated example, user 102 may create respective folders for a grocery list 134, a to-do list 136, photos 138, links 140 and a research project 142. Other similar or different folders may be created by other users in other instances. Here, user 102 may send a message (e.g., a text message sent to a short code associated with service 110) that includes phrase 126, an identification of grocery list 134 and an identification of a grocery.

For instance, user 102 could send a text message with the following syntax: "Feisty Mango grocerylist=1 apple." At least in part in response to receiving this message, transaction processing service 110 may extract the received phrase, associate the received phrase with user account 118(M), extract and identify grocery list 134 and, finally, can add the note "1 apple" to grocery list 134. User 102 can periodically send these messages, possibly via different communication channels, so as to keep the grocery list in a single location. The user may do the same for to-do list 136 and multiple other lists or the like.

In some instances, transaction processing service 110 may automatically determine where to store a received piece of content in response to receive a message from user 102. For instance, in the illustrated example user 102 configures user account 118(M) to include a repository for photos 138. Here, when user 102 sends messages that include the phrase "Feisty Mango" along with a picture or image file to service 110, service 110 may identify this phrase and photo and may automatically store the picture in pictures folder 138. The same may hold true for other types of content, such as videos, text messages, emails or any other similar or different type of content.

In the illustrated example, user 102 has also created a links folder 140 to store different links at the request of user 102 and potentially one or more other users. For instance, user 102 may send an identification of a uniform resource locator (URL) along with the phrase "Feisty Mango" to transaction processing service 110 and, in response, service 110 may store this URL along with any other previously received links. User 102 may then later access user account 118(M) to view the user's collection of stored URLs that may be of interest to user 102. As such, service 110 essentially provides a universal bookmark tool with use of phrase 126 ("Feisty Mango") and links folder 140.

To enable user 102 to provide these URLs for storage by transaction processing service 110, service 110 or another entity may provide a plug-in (or other functionality) to a browser or other client application that computing device 112 uses to accesses network 114. For instance, service 110 may provide a plug-in to a browser that, when installed on computing device 112, renders a toolbar that includes a text box and a control entitled "Remind Me" or the like. In this instance, when user 102 uses computing device 112 to visit a particular URL and wishes to save this URL for later viewing, user 102 may enter phrase 126 ("Feisty Mango") into the text box and may select the control icon. In response, computing device 112 may send this phrase and the URL being viewed by user 102 to transaction processing service 110. In response to receiving this message, service 110 may extract the phrase and may store the received URL in links folder 140 for later viewing by user 102. While one example has been provided, user 102 may provide links for storage to transaction processing service 110 in any other similar or different manner.

In one specific instance, links folder 140 may contain URLs associated with multiple different items offered for consumption by different vendors. In certain implementations, service 110 may itself comprise a vendor (e.g., an e-commerce site) that also offers items for sale or other consumption. In this example, links folder 140 may essentially comprise a wish list or a universal shopping cart of items that user 102 may later purchase or otherwise consume, either from service 110, other vendors or a combination thereof.

If, for instance, user 102 is currently researching bicycles over network 114 for a later purchase, user 102 could store multiple different URLs associated with multiple different bicycles in association with phrase "Feisty Mango." After storing these links, user 102 may later access links folder 140 to select which items user 102 would like to purchase (if any) and which items user 102 would like to refrain from purchasing (if any). Furthermore, transaction processing service 110 may then initiate purchase of the selected items by, for instance, ordering the selected items from the associated vendors and charging payment instrument(s) 130 for the transaction(s).

FIG. 1 also illustrates that user 102 may define research project folder 142. Here, envision that user 102 is working a particular research project and would like a repository for storing a variety of different content that the user encounters when completing a research project. As such, user 102 may store links, photos, text messages, articles, videos, images or any other similar or different content by sending this content along with an identification of phrase 126 ("Feisty Mango") to transaction processing service 110.

Furthermore, in some instances user 102 may create new custom phrases for storing certain types of content or to perform any of the techniques described herein. Continuing the research project example, for instance, envision that user 102 is working on a research project that focuses on the Jurassic age and the dinosaurs that existed during that time. Here, user 102 may create a phrase "Dinosaur Diary" and may request that transaction processing service 110 associate this phrase with user account 118(M). Furthermore, user 102 may create rules with this phrase that aligns with the user's goal of maintaining a repository of content that relates to the user's research project. As such, user 102 may create a rule that states that each piece of content that service 110 receives with the phrase "Dinosaur Diary" should be stored in project research folder 142. As such, user 102 may simply send the content with the phrase and without any further corresponding syntax for storage of the content by service 110.

Also as described briefly above, user 102 may set up certain rules and/or preferences in association with the user account 118(M) and phrase(s) 126 for use in conducting transactions with vendors 104(1)-(N). For instance, user 102 may create a rule that instructs transaction processing service 110 to request performance of a service from a specified vendor in response to receiving a specified command with phrase 126 or another identifier. For instance, the user may configure the user's account such that when user 102 sends a message (e.g., an email, an SMS text message, etc.) comprising the phrase "Feisty Mango" and a specified command (e.g. "Latte"), the transaction processing service will send a request to a user-specified vendor to perform the specified command.

Again, user 102 may pre-specify preferences 132 that the transaction processing service should request. In the instant example, user 102 may specify that transaction processing service 110 should request a tall, extra hot, extra foam vanilla latte from a pre-specified coffee shop (at a pre-specified location) to be ready in a pre-specified amount of time (e.g., ten minutes) in response to receiving the message comprising "Feisty Mango latte." In addition, in instances where phrase 126 is associated with payment instrument 130 of user 102, transaction processing service 110 may prepay for the requested service (here, the latte) with use of payment instrument 130.

In this example, user 102 sends a message comprising the phrase "feisty mango" and a command "latte." In response to receiving this message, service 110 correlates the phrase with user account 118 and the command with rules 128. Rules 128 direct service 110 to order a latte having user-specified preferences 132 from the specified coffee shop (e.g., vendor 104(N)). User 102 may configure user account 118(M) for any other sort of vendor, such as restaurants, video stores, bicycle shops, grocery stores, e-commerce sites, professional service vendors (e.g., doctors' offices) or any other similar or different vendors. For instance, user 102 may create a rule that directs service 110 to order and pay for a specific entrée at a specific restaurant in response to receiving an email, text message or other communication that comprises the string "Feisty Mango Dinner." Similarly, user 102 may create a rule to instruct service 110 to rent a specific type of movie (e.g., "New Release Action in Blue Ray DVD format") in response to receiving a message comprising "Feisty Mango Video."

In addition or in the alternative, user 102 and transaction processing service 110 may create a phrase that is by definition associated with one or more specified rules and, as such, requires no further command when employed by user 102. For instance, returning to the coffee shop example, user 102 and service 110 may associate a phrase "My Work Latte" with user account 118(M). In addition, user 102 may create the rules discussed above. Here, however, service 110 instructs vendor 104(N) (the specified coffee shop) to have a tall, extra hot, extra foam vanilla latte ready in ten minutes. In addition, service 110 may either charge a specified payment instrument or may provide the payment instrument information to vendor 104(N) for charging user 102 for the latte. As such, user 102 is able to simply send a message (e.g., an SMS text message) comprising or consisting of the phrase "My Work Latte" to transaction processing service 110. After doing so, user 102 may travel to his local coffee shop specified by rules 128 and/or preferences 132 and, in ten minutes time, may pick up his prepaid latte prepared exactly to his likings (and as specified by rules 128 and/or preferences 132).

In some instances, service 110 may require that user 102 somehow authenticate with service 110 before fulfilling the request. For instance, service may require that user 102 send a message comprising or consisting of the phrase and the corresponding PIN (e.g., "My Work Latte 7777"). In other instances, service 110 may determine a mobile phone number or other device identifier associated with a device that sent the message as a form of authentication. For instance, user 102 may register a mobile phone number with service 110 such that when user 102 sends the afore-mentioned SMS text message ("My Work Latte") to service 110, service 110 compares a number that the message originated from with the phone number associated with the user account associated with the phrase. If these numbers match, then service 110 may continue through with the requested order and may charge payment instrument 130 for this transaction. If these numbers do not match, service 110 may reject the request.

In still other instances, user 102 may alternatively make the afore-mentioned request with use of an identifier other than a phrase. For instance, user 102 may create a rule that instructs transaction processing service 110 to make the afore-mentioned request for a latte in response to receiving the word "latte" from a device associated with user 102 and user account 118(M).

For instance, user 102 may send a request comprising the word "Latte" from a mobile phone of user 102 that is registered with service 110 and associated with user account 118(M). In response, service 110 may check the mobile phone number of the device that originated the request. If the mobile phone number matches a registered mobile phone number, then service 110 may proceed to order the latte from vendor 104(N) and may pay for the latte with use of payment instrument 130. In some instances, service 110 may require that user 102 send authentication information (e.g., a PIN) or service 110 may send a verification request back to the requesting device or another location. If, however, service 110 receives a request from an unknown or unregistered device, then service 110 may deny the request. While this example describes the use of a mobile phone, other implementations may use similar techniques for any other form of computing device.

While the above techniques describe user 102 sending a request to transaction processing service 110, which in turn sends a request to one of vendors 104(1)-(N), user 102 may send these requests directly to the vendors in some instances. For instance, user 102 may send a message directly to vendor 104(N) comprising the phrase "Feisty Mango." In response, vendor 104(N) may send a request to transaction processing service 110 for instructions regarding this phrase. Here, user 102 may have previously set up a rule at transaction processing service 110 stating that if the user sends the phrase "Feisty Mango" to a coffee shop, user 102 is ordering the latte described above. As such, in response to receiving the request for instructions from vendor 104(N), service 110 may provide the request for the specified latte to vendor 104(N). In some instances, service 110 may also pay for the service (here, the latte) with use of payment instrument 130 or may pass this payment information to vendor 104(N) for charging user 102.

In addition or in the alternative, user 102 may also include additional information in the message sent to vendor 104(N). For instance, user 102 may send the corresponding PIN associated with phrase 126, which vendor 104(N) may pass to service 110 to authenticate user 102 and the user's request. User 102 may also include some or all of the information used to perform the request. For instance, user 102 may include the term "latte," as well as preferences of the latte (e.g., "tall, extra hot, extra foam, vanilla").

In instances where user 102 sends the request directly to vendor 104(N), user 102 may send this request via a variety of different communication channels. For instance, user 102 may send an SMS or MMS text message, an email, a voicemail, a fax, a request via a user interface provided by vendor 104(N) (e.g., on a web page associated with the vendor) or any other similar or different type of message. Regardless of the communication technology used, the message sent may identify vendor 104(N). For instance, user 102 may send an email to an email address associated with vendor 104(N). In instances where user 102 sends a text message, meanwhile, user 102 may identify the vendor with use of a short code associated with a vendor. For instance, user 102 may send a text message to a short code that is associated with the exact coffee shop where user 102 plans to pick up the latte or, conversely, user 102 may send the text message to a short code associated with a corporate location of the coffee shop.

For instance, envision that user 102 orders his latte from a large coffee shop having locations all around the world. Each user that orders coffee or otherwise makes a request may send these requests to a same short code associated with the global company. This central location may then determine preference information associated with each request and, in response, may send the request to the appropriate branch of the coffee shop (e.g., $7^{th}$ and Pike, Seattle, Wash.). The central location may also determine location information associated with the requesting user or the requesting device and may recommend a location based on this information.

In still other instances, user 102 may identify vendors with use of a phrase associated with the vendors themselves. FIG. 1, for instance, illustrates that vendor 104(1) (e.g., a video store) is associated with the phrase "Video Box," while vendor 104(N) (e.g., a coffee shop) is associated with the phrase "Cup of Joe." Therefore, user 102 may send a message to a vendor, with the message including both the phrase of the user as well as a phrase of the vendor. Conversely, user 102 may send the message including both phrases to transaction processing service 110, with service 110 then initiating the requested transaction.

In the former instances, user 102 could send a text message to the general short code associated with the global coffee shop discussed above, with the message comprising the following: "Feisty Mango, Cup of Joe." The former phrase may identify user 102 (as well as the rules and preferences associated with the user), while the latter phrase may identify vendor 104(N). In instances where the global coffee store has numerous locations, each location may be associated with a particular phrase. In the example where vendor 104(N) comprises a branch of the coffee store located at $7^{th}$ and Pike in Seattle, Wash., the phrase "Cup of Joe" may identify this exact location. So, in response to receiving the message, the receiving entity of the coffee shop may determine that user 102 intends to order the latte described above, to be ready in ten minutes at the coffee shop located at $7^{th}$ and Pike in Seattle (associated with the phrase "Cup of Joe").

In another example, user 102 could send a message to vendor 104(1), with the message comprising the phrase "Feisty Mango" as well as the phrase "Video Box." Again, user 102 could send this message via a text message, an email or any of the communication methods discussed above. In response to receiving this message, vendor 104(1) may perform the requested service, such as having a new release, action blue-ray DVD either downloaded to a specified device of user 102 or awaiting user 102 at the brick-and-mortar video store. In either of these instances, vendor 104(1) or transaction processing service 110 may charge payment instrument 130 for the transaction.

Illustrative Flow Diagrams

Having described an example architecture that includes a transaction processing service configured to implement the described techniques, the discussion proceeds to several flow diagrams of example processes for implementing the techniques. Each of the described processes can be implemented in hardware, software, or a combination thereof. In the context of software, the illustrated operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 2:
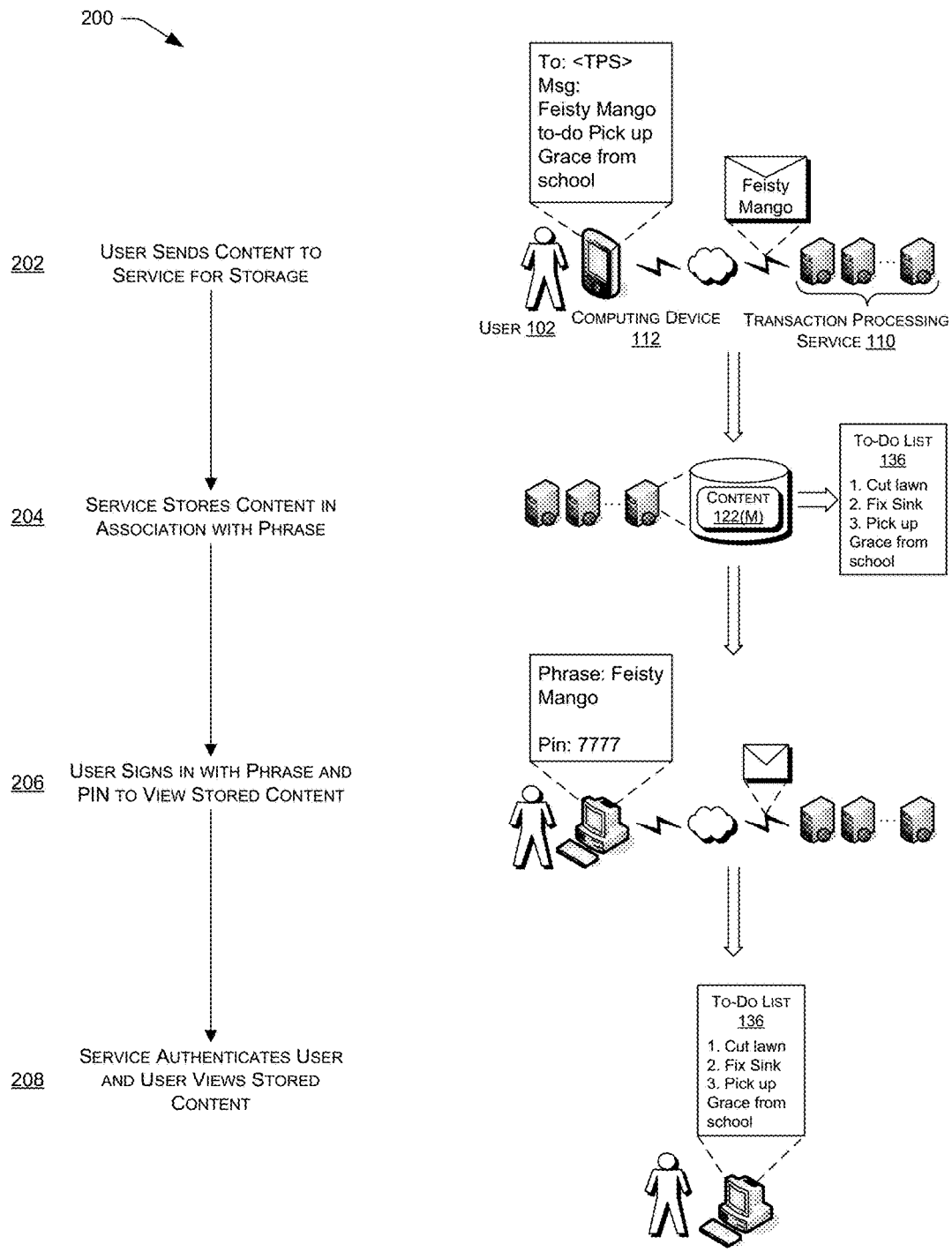
FIG. 2 illustrates a flow diagram of an example process that includes the transaction processing service storing content in association with the phrase at the request of the user.

FIG. 2 illustrates a flow diagram of an example process 200 that includes transaction processing service 110 from FIG. 1 storing content in association with phrase 126 at the request of user 102. Process 200 begins at operation 202, at which point user 102 sends a piece of content (or an identification of a piece of content, such as a link to the content) to transaction processing service 110 for storing the content in association with phrase 126 of user 102. This message may also identify phrase 126. Here, user 102 sends the following SMS text message: "Feisty Mango to-do Pick up Grace from school." While this example and others that follow describe a text message, user 102 may send these messages via any other communication method discussed above or otherwise.

In this example, the message that user 102 sends includes an identification of the phrase "Feisty Mango," an identification of to-do list folder 136 ("to-do") and a text string for storage in association with folder 136. Specifically, this text message comprises a syntax that instructs service 110 to store the text string "Pick up Grace from school" in to-do list folder 136, which is associated with user account 118(M) and the phrase "Feisty Mango." As such, user 102 is able to easily add items the to-do list of user 102 with use of phrase 126.

Next, at operation 204 transaction processing service 110 receives the message, extracts the phrase and identifies the corresponding user account with use of the extracted phrase. Service 110 then extracts the identification of to-do list folder 136 and stores the content ("Pick up Grace from school") in the folder. At a later time, user 102 may desire to view the content stored in to-do list folder 136, possibly along with other content that service 110 has stored in association with the phrase "Feisty Mango." As such, at operation 206 user 102 signs in to user account 118(M). Here, user 102 provides the phrase "Feisty Mango" and the corresponding PIN to sign in to user account 118(M), however user 102 may sign in with login information 124 or in any other manner in other instances. Finally, at operation 208 and after authenticating user 102, service 110 may grant access to user account 118(M) to user 102. User 102 may thereafter view the content stored in to-do list folder 136, as FIG. 2 illustrates.

Figure 3:
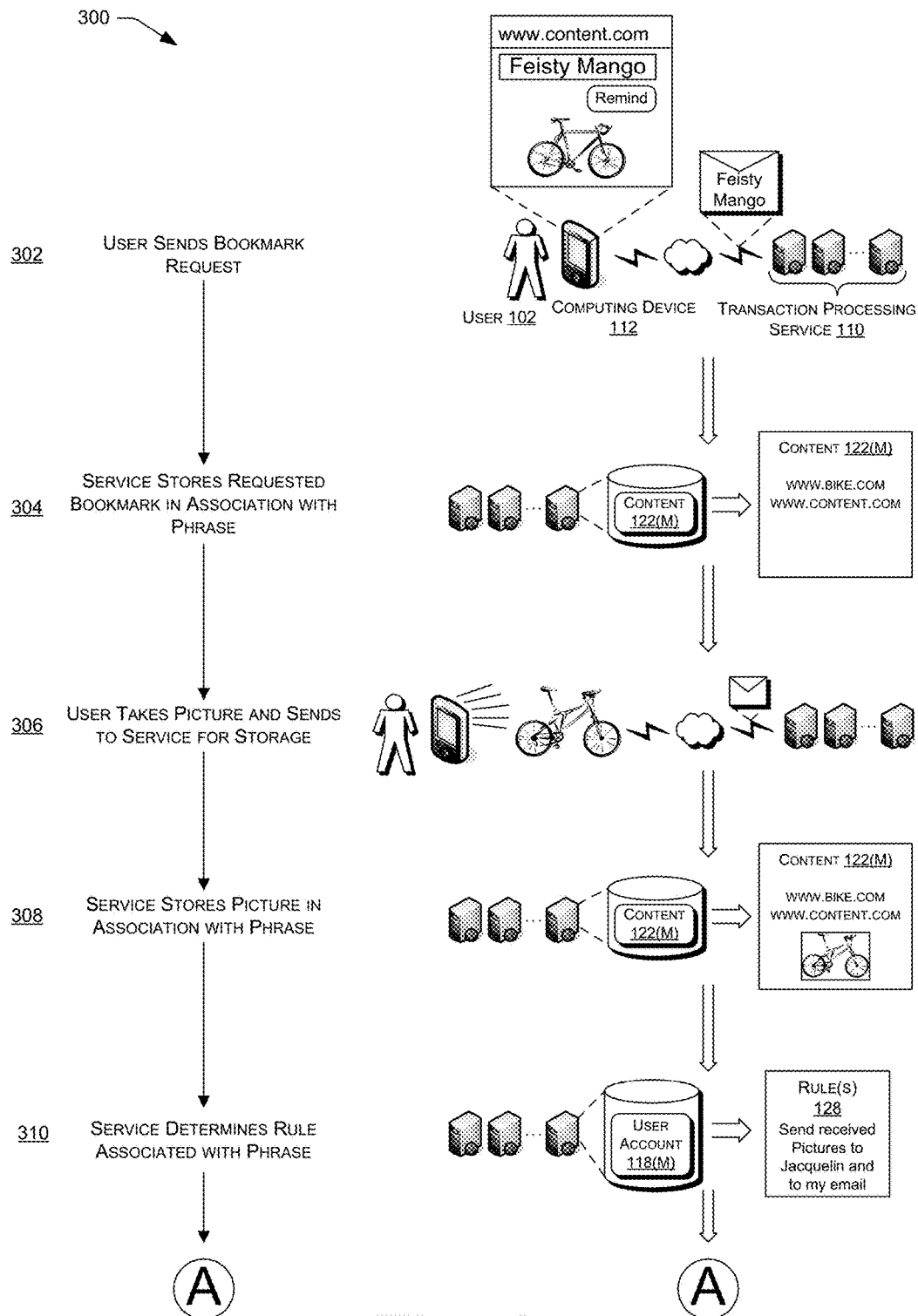
FIGS. 3-4 illustrate a flow diagram of an example process that includes the transaction processing service storing content in association with the phrase at the request of the user. The transaction processing service also forwards the content to one or more other destinations, as specified by rules associated with the phrase.
Figure 4:
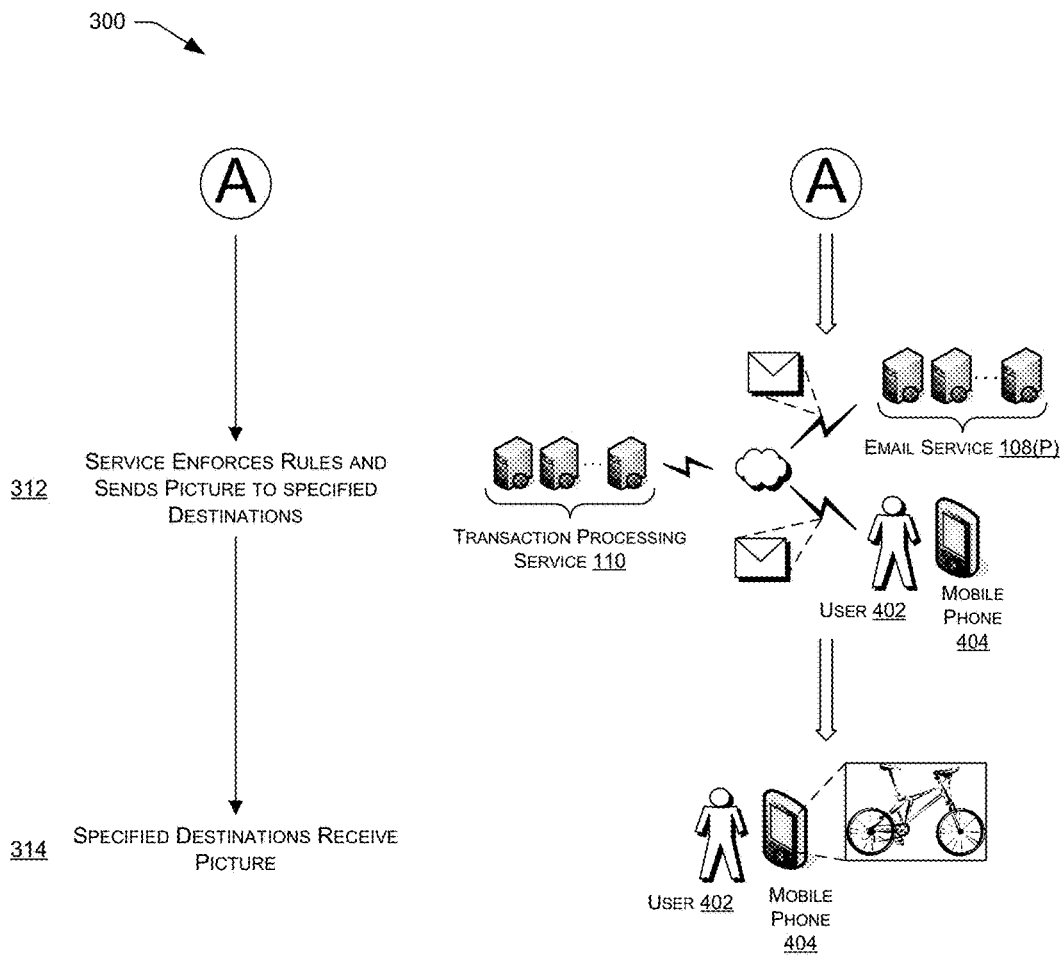

FIGS. 3-4 illustrate a flow diagram of an example process 300 that includes transaction processing service 110 storing content in association with phrase 126 at the request of user 102. In addition, service 110 forwards this content to one or more other destinations, as specified by rules 128 associated with phrase 126. In this example process, user 102 stores content associated with bicycles that user 102 is researching for the purpose of potentially purchasing a bicycle.

Process 300 includes, at operation 302, user 102 sending a request to bookmark a specified URL regarding the illustrated bicycle to transaction processing service 110. As discussed above, user 102 may have navigated to the URL and then provided the phrase "Feisty Mango" in a text box of a toolbar of the browser. User 102 may then have selected control (e.g., "Remind Me" or "Remind") that, when selected, sent the specified URL to service 110 for storage in association with phrase 126. Next, at operation 304, service 110 stores the requested bookmark comprising the URL in association with the phrase "Feisty Mango."

Process 300 then proceeds to operation 306, which represents user 102 taking a picture (of another bicycle) with use of the user's mobile phone and sending the picture along with phrase 126 to service 110. For instance, user 102 may send an MMS message or an email to service 110. In response to receiving this message, service 110 stores the received picture in association with user account 118(M) and received phrase 126 at operation 308. At operation 310, meanwhile, service 110 analyzes rules 128 of user account 118(M) to determine that user 102 has created a rule instructing service 110 to send pictures received with the phrase "Feisty Mango" to a specified mobile phone number (of another user, "Jacquelin"), as well as a to a specified email of user 102.

FIG. 4 continues the illustration of process 300 and begins with transaction processing service 110 enforcing the user-specified rule at operation 312. For instance, service 110 may send the received picture to both specified destinations, namely the mobile phone number and the email address. Finally, operation 314 represents that the specified destinations receive the content. For instance, a user 402 ("Jacquelin") receives the picture from service 110 at a mobile phone 404 of user 402. In addition, the email account associated with user 102 may also receive the picture from service 110 during this operation.

Figure 5:
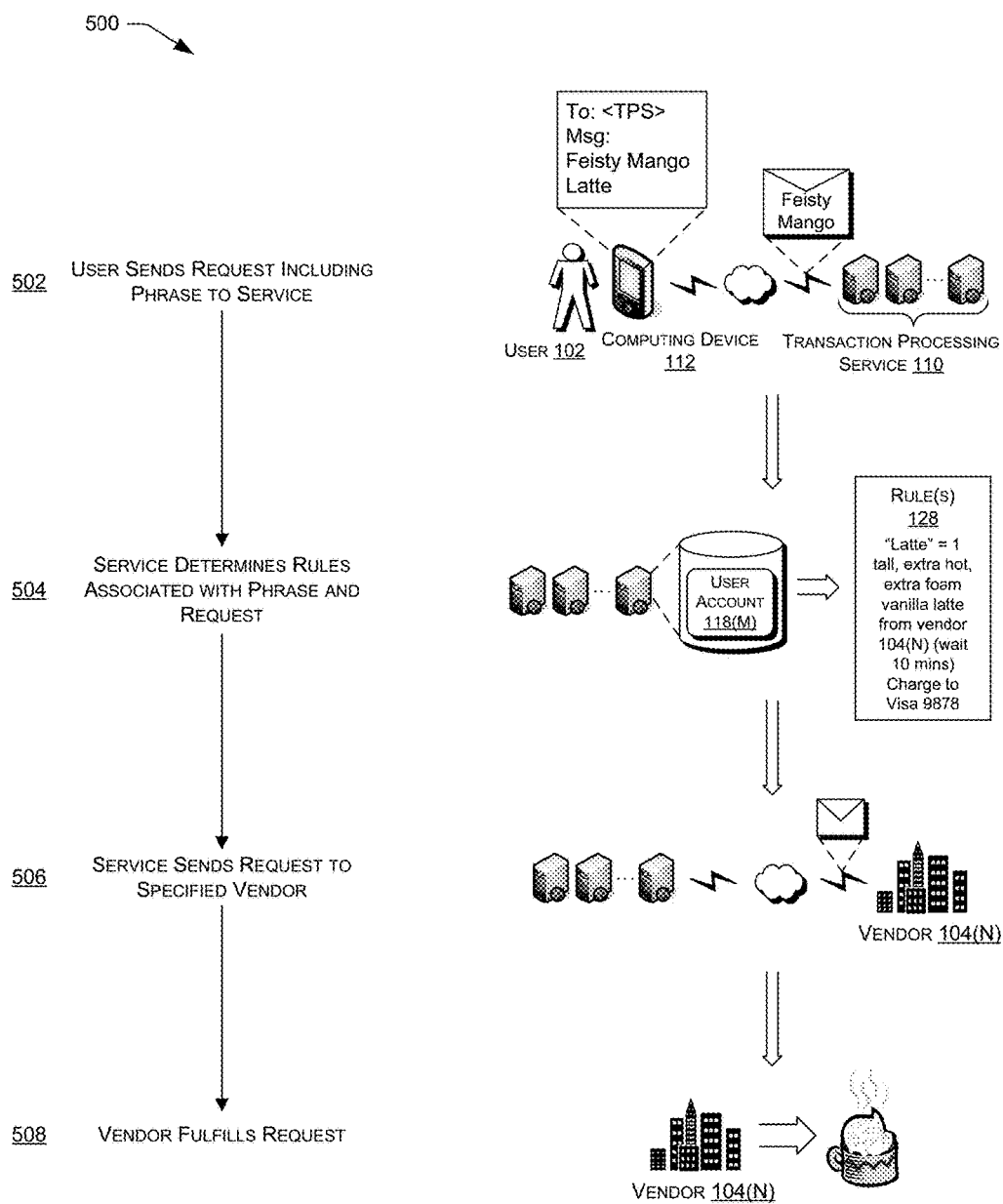
FIG. 5 illustrates a flow diagram of an example process that includes the transaction processing service receiving a phrase and a request to perform a service from a user. In response, the transaction processing service instructs a vendor to perform the requested service.

FIG. 5 illustrates a flow diagram of an example process 500 that includes transaction processing service 110 receiving phrase 126 and a request to perform a service from user 102. In response, transaction processing service 110 instructs specified vendor 104(N) to perform the requested service. Here, the request comprises a request to make ready a latte according to predefined preferences 132 of user 102. However, user 102 may request any other service in other instances. For example, user 102 could request rental of a DVD, preparation of a specified meal by a specified restaurant, the purchase and shipment of an item for sale or any other similar or different action.

Process 500 includes operation 502, at which point user 102 sends the following example text string to transaction processing service 110: "Feisty Mango Latte." In response to receiving this message and at operation 504, service 110 identifies user account 118(M) associated with phrase 126 and examines rules 128 and/or preferences 132 to determine that user 102 has defined the word "latte" to comprise a request for a specific kind of late from a specific location of a coffee shop. For instance, this rule may state that the command "latte" directs transaction processing service 110 to order one tall, extra hot, extra foam vanilla latte from a particular location of a coffee shop. In addition, this rule or preference may specify that the latte should be ready in ten minutes and should be charged to payment instrument 130.

Next, service 110 sends the determined request to specified vendor 104(N) (here, the coffee shop) for fulfillment of the request at operation 506. Finally, at operation 508, vendor 104(N) fulfills the request for the latte made by user 102. With use of process 500, user 102 may simply send a message comprising the user's phrase and a command to transaction processing service and, in ten minute's time, proceed to vendor 104(N) to pick up the user's prepaid latte, prepared exactly in accordance with the preferences of user 102.

In some instances, vendor 104(N) may first attempt to authenticate user 102 before fulfilling the request. For instance, vendor 104(N) may require that (or user 102 may simply provide) a password or PIN be sent with or after the request. Vendor 104(N) may then determine (e.g., by querying service 110) whether or not the received password or PIN is associated with the received phrase and/or user account 118(M) of user 102. In response to determining that the password or PIN is associated with the user account, vendor 104(N) and/or service 110 may authenticate the user and proceed to fulfill the request. In response to determining that the password or PIN is not associated with the user account, then vendor 104(N) and/or service 110 may refrain from authenticating user and vendor 104(N) may refrain from fulfilling the request.

In instances where user 102 sends a request from a mobile phone, meanwhile, vendor 104(N) may use a mobile phone number of the phone to authenticate the user. For instance, vendor 104(N) may determine (e.g., by querying service 110) whether the mobile phone number from which the request was sent is associated with the received phrase and/or the user account. Again, vendor 104(N) may fulfill the request if user 102 sends the request from the user's mobile phone and vendor 104(N) may refrain from fulfilling the request if the user does not.

Figure 6:
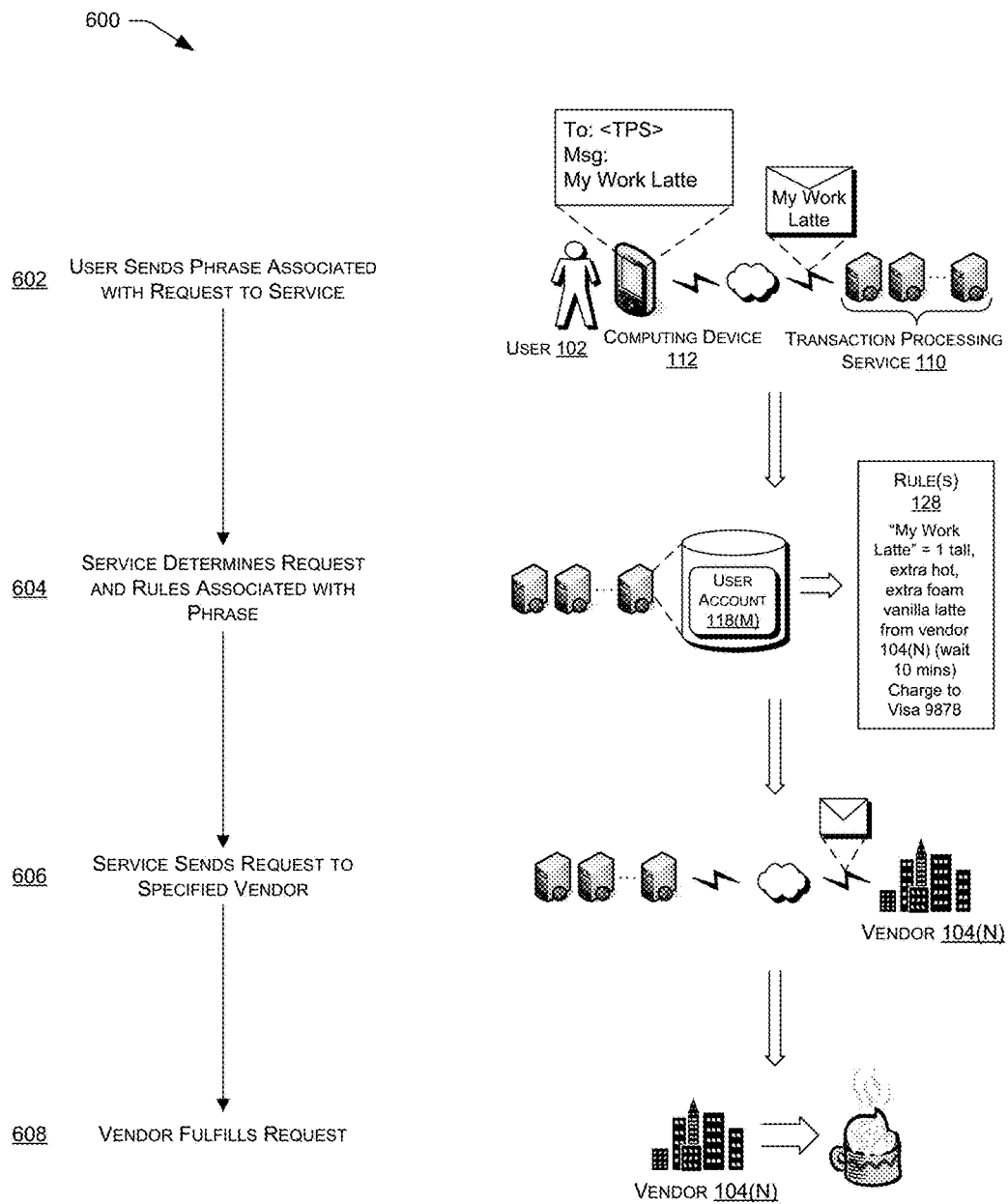
FIG. 6 illustrates a flow diagram of an example process that includes the transaction processing service receiving a phrase from a user and, in response, determining a request for a service specified by the phrase. After determining the requested service, the transaction processing service then instructs a vendor to perform the requested service.

FIG. 6 illustrates a flow diagram of an example process 600 that includes transaction processing service 110 receiving phrase 126 from user 102 and, in response, determining a request for a service specified by the phrase. After determining the requested service, transaction processing service 110 then instructs a specified vendor to perform the requested service.

Process 600 begins, at operation 602, with user simply sending a message comprising or consisting of a phrase "My Work Latte" that may be a phrase 126 associated with user account 118(M) to service 110. This phrase, however, may be uniquely associated with a rule that simply relates to the ordering of a latte from vendor 104(N). At operation 604, service 110 receives the phrase, identifies user account 118(M) with use of the phrase and determines the rule associated with this phrase. Here, the rule may comprise the same as the rule discussed above in regards to FIG. 5. That is, user 102 may have created a rule that instructs service 110 to order a tall, extra hot, extra foam, vanilla latte from a particular coffee shop (vendor 104(N)) in response to receiving the phrase "My Work Latte." In some instances, service 110 may also require that user 102 send the corresponding PIN or may require that user 102 send the request from a mobile phone number associated with user account 118(M). Furthermore, the specified rule may also instruct service 110 to pay for the latte with use of payment instrument 130 and may instruct service 110 to instruct vendor 104(N) to have the latte ready in ten minutes time.

At operation 606, transaction processing service 110 sends the request to specified vendor 104. At operation 608, vendor 104(N) receives the request and prepares the latte as specified by service 110 and rules 128 of user account 118(M).

Figure 7:
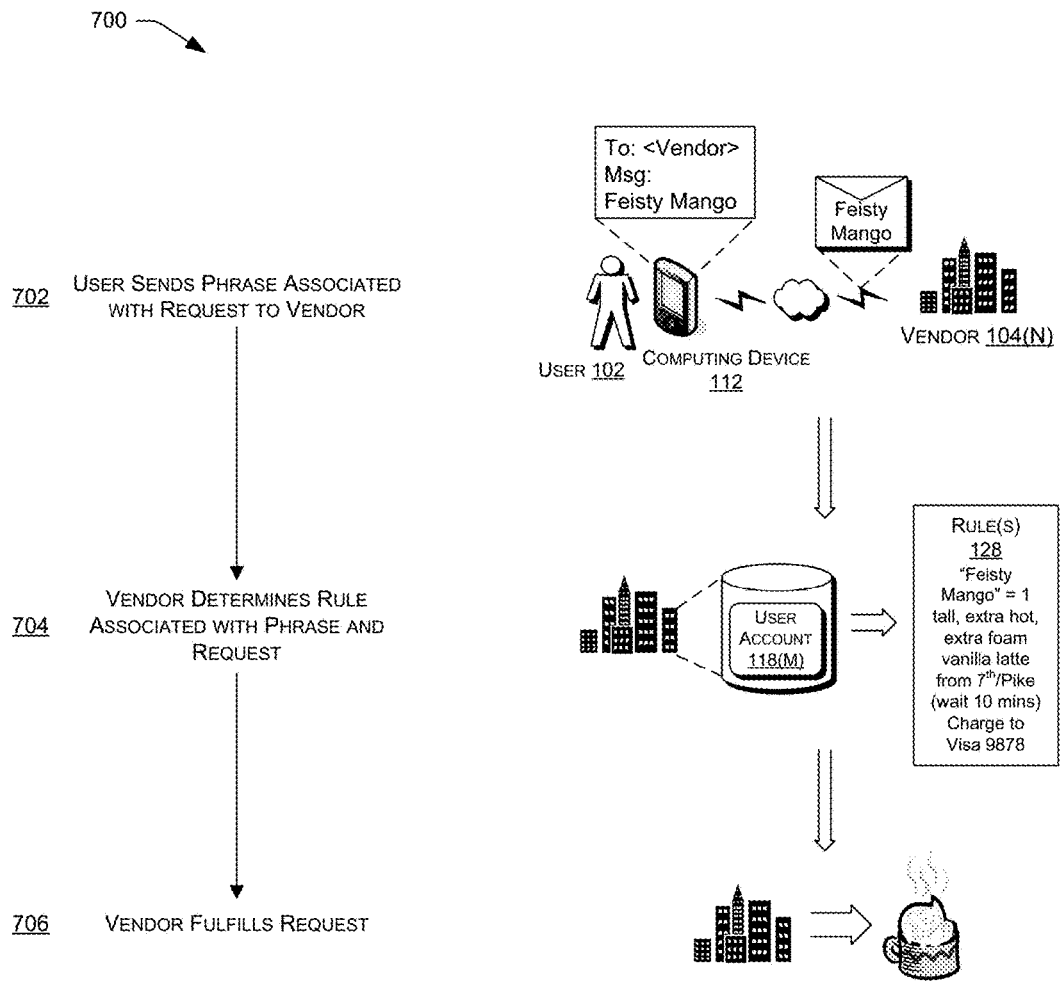
FIG. 7 illustrates a flow diagram of an example process that includes a vendor receiving a phrase and, in response, determining a request for a service specified by the phrase. In response, the vendor performs the requested service in a manner specified by the phrase.

FIG. 7 illustrates a flow diagram of an example process 700 where user 102 sends a request for a service directly to a vendor rather than through transaction processing service 110. In response, the vendor may perform the requested service in a manner specified by the phrase that accompanies the request.

Process 700 begins with operation 702, which illustrates that user 102 sends a phrase associated with a request to a vendor 104(N) (again, the coffee shop). As with each process described above and below, this message may comprise a text message, an email or any other form of communication. In some instances, user 102 sends the message directly to the coffee shop or branch of the coffee shop that user 102 wants to have prepare the latte. In other instances, meanwhile, user 102 may send the message to a central location which determines which of multiple branches to send the request to. Here, the central location determines that user 102 would like this request to go to the coffee shop on 7$^{th}$ and Pike in Seattle, Wash.

At operation 704, vendor 104(N) determines a rule associated with the received phrase "Feisty Mango." In some instances vendor 104(N) may query service 110 for this information, while in other instances vendor 104(N) may store this information locally and may query this local storage.

In either event, vendor 104(N) determines, at operation 704, that user account 118(M) associated with phrase 126 includes a rule that states that user 102 desires the latte described above when user 102 sends the phrase "Feisty Mango" to a coffee shop. As such, vendor 104(N) prepares the latte and charges the specified payment instrument or requests that service 110 charge this payment instrument at operation 706.

Furthermore, while process 700 describes that user 102 may communicate directly with vendor 104(N) with only a phrase, user 102 may also include an explicit command in some instances. For instance, user 102 may send a text string "Feisty Mango latte" to vendor 104(N), which may, in response, prepare a latte in accordance with preferences 132 of user account 118(M). In addition, while process 700 describes the use of a phrase, in other implementations of this process (and each other process described throughout) user 102 may use any other sort of identifier. For instance, user 102 may simply send a request comprising the word "latte" from a mobile phone of user 102 and to vendor 104(N) or service 110. Vendor 104(N) and/or service 110 may identify this mobile phone number as being associated with user account 118(M) and, in response, may examine rules 128 associated with user account 118(M). Again, vendor 104(N) and/or service 110 may determine that these rules instruct preparation of a tailored latte by vendor 104(N).

Figure 8:
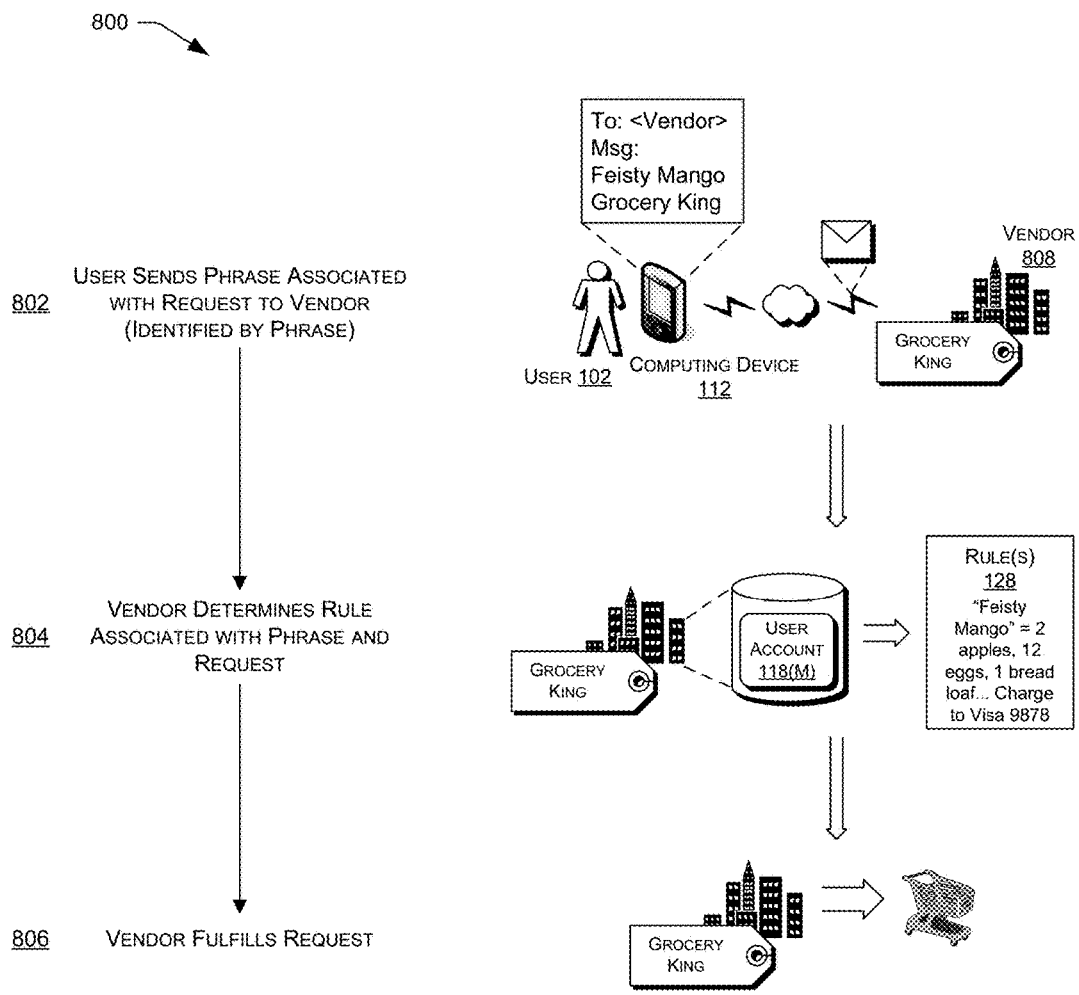
FIG. 8 illustrates a flow diagram of an example process that includes a vendor receiving a phrase and, in response, determining a request for a service specified by the phrase. In response, the vendor performs the requested service in a manner specified by the phrase. Here, the user also identifies the vendor with use of a phrase that is uniquely associated with the vendor.

FIG. 8, meanwhile, illustrates a flow diagram of an example process 800 that includes a vendor 808 receiving phrase 126 and, in response, determining a request for a service specified by phrase 126. Here, user 102 identifies vendor 808 with use of a phrase that is uniquely associated with the vendor.

Process 800 begins, at operation 802, with user 102 sending a phrase associated with a request ("Feisty Mango") to a vendor that is also identified by a phrase ("Grocery King"). Here, user 102 may send this message as an SMS text message to a short code associated with a grocery chain. Furthermore, user 102 may identify a particular branch of the grocery chain with use of a phrase that uniquely identifies a branch that is local to user 102 (e.g., "Grocery King"). Next, at operation 804, vendor 808 determines a rule associated with phrase 126. Again, vendor 808 may query for this information from service 110 or may store this information locally. In either event, vendor 808 may determine that user account 118(M) includes a rule that states that when user 102 sends phrase 126 to a grocery store, the grocery store should fulfill the pending grocery list 134 for user 102 and charge payment instrument 130. As such, at operation 806, vendor 808 proceeds to collect the items listed on grocery list 134 and, when finished, charge payment instrument 130. As such, after sending the message to vendor 808, user 102 is able to travel to the vendor to pick up the paid-for groceries or, in some instances, vendor 808 may deliver the groceries to an address of user 102, as provided by phrase 126 and user account 118(M).

Furthermore, while process 800 illustrates user 102 sending the message directly to vendor 808, in other instances user 102 may send this message to transaction processing service 110. In response, service 110 may identify vendor 808 with use of the phrase "Grocery King," and may proceed to implement the remainder of process 800.

Figure 9:
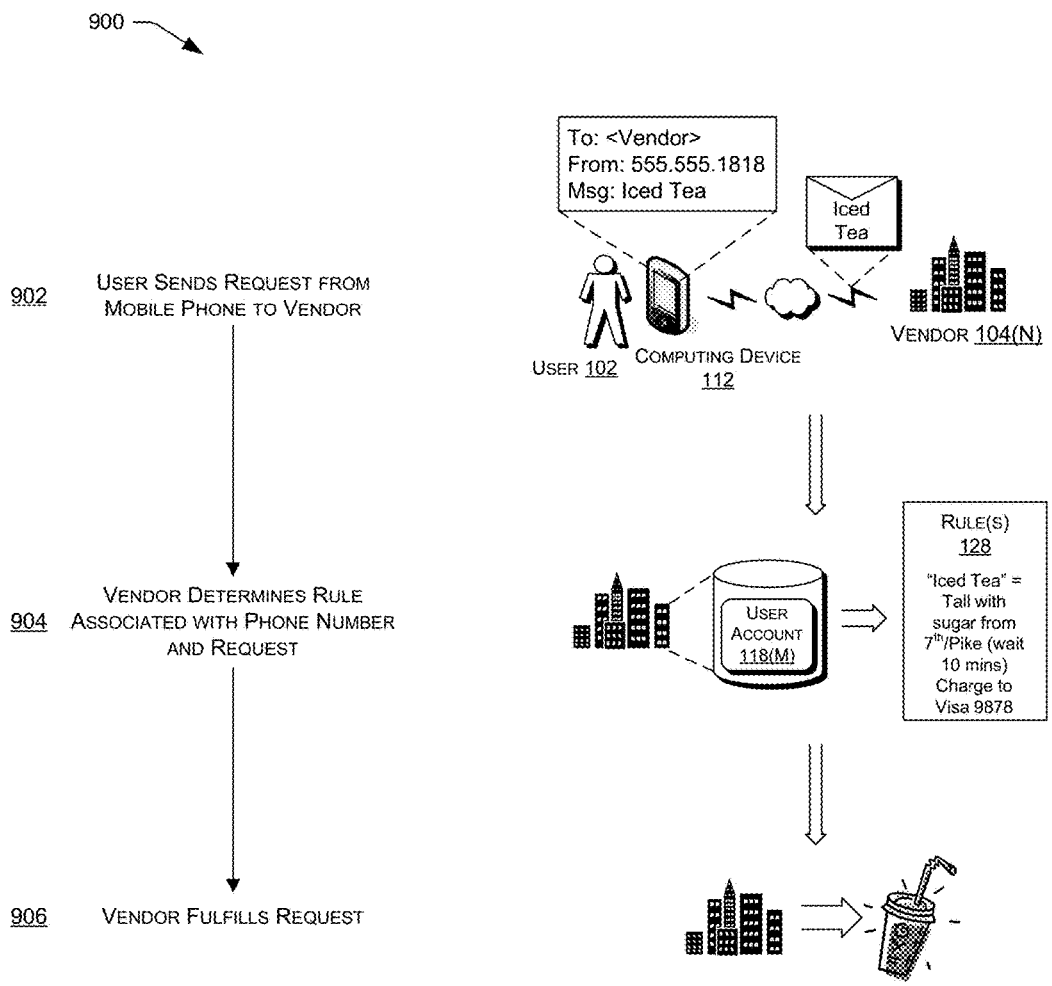
FIG. 9 illustrates a flow diagram of an example process that includes a vendor receiving a request from a particular mobile phone number and, in response, determining a preference associated with the phone number. The vendor then fulfills the request accordingly.

FIG. 9 illustrates a flow diagram of an example process 900 that includes, at operation 902, user 102 sending a request to vendor 104(N) from a mobile phone of the user. As illustrated, user 102 sends a request for an "Iced Tea" from the mobile phone of the user having the mobile phone number of "555.555.1818." After receiving the request at operation 902, vendor 104(N) determines, at operation 904, a user account that is associated with the phone number from which the request was received. For instance, vendor 104(N) determines that the phone number 555.555.1818 maps to user account 118(M) associated with user 102. Vendor 104(N) may also determine, from the request, that user 102 has sent a request that vendor 104(N) has previously configured to map to a service offered by the vendor. For instance, vendor 104(N) here has previously configured the request "Iced Tea" to map to an iced tea drink served by the vendor. Vendor 104(N) may also have publicized that users, such as user 102, can order an Iced Tea from Vendor 104(N) by sending a text message or the like comprising or consisting of the request "Iced Tea."

After making these determinations, vendor 104(N) may determine one or more rules associated with user account 118(M) and the request at operation 904. For instance, vendor 104(N) may determine a rule that states that when user 102 sends a request for "Iced Tea," then the coffee shop on 7$^{th}$ and Pike should prepare (in ten minutes) a tall Iced Tea with Sugar and should pay for the drink with the specified credit card. After making these determinations, vendor 104(N) may fulfill the request for the Iced Tea in accordance with the preferences stated by the rule. As such, user 102 is able to send an SMS text message, MMS message, email or the like to vendor 104(N) and, in ten minutes time, is able to proceed to vendor 104(N) to pick up the requested item.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. One or more non-transitory computer-readable media storing computer-executable instructions that, when executed by one or more processors of a computing device, cause the one or more processors to perform acts comprising:

receiving, at the computing device, a plurality of transaction phrase tokens, individual ones of the plurality of transaction phrase tokens being associated with one or more user-specified storage rules identifying different storage locations in a memory of the computing device and one or more user-specified communication rules identifying different sets of one or more destination computer devices that are external to the computing device;

storing the plurality of transaction phrase tokens, the one or more user-specified storage rules, and the one or more user-specified communication rules in the memory of the computing device;
receiving, at the computing device from a user device over a network, a message having a syntax that includes a transaction phrase token, a customized content type indicator, and a content element;
interpreting the message to extract the transaction phrase token, the customized content type indicator, and the content element;
identifying, in the memory, the transaction phrase token within the plurality of transaction phrase tokens;
identifying, in the memory, a particular user-specified storage rule within the one or more user-specified storage rules that is associated with a combination of the transaction phrase token and the customized content type indicator;
storing the content element in the storage location identified by the particular user-specified storage rule;
identifying, in the memory, a particular user-specified communication rule within the one or more user-specified communication rules that is associated with the combination of the transaction phrase token and the customized content type indicator; and
causing the content element, or information associated with the content element, to be sent over the network to the one or more destination computer devices identified by the particular user-specified communication rule.

2. One or more non-transitory computer-readable media as recited in claim 1, wherein the content element comprises an item offered for consumption and the particular user-specified storage rule identifies, as the storage location, a memory location for a shopping cart associated with the transaction phrase token.

3. One or more non-transitory computer-readable media as recited in claim 1, wherein the content element comprises a string of text, a link, a web page, an image, or a video.

4. One or more non-transitory computer-readable media as recited in claim 1, wherein the transaction phrase token is associated with a user, and wherein the storing of the content element in the storage location comprises storing the content element in association with the transaction phrase token in an account of the user in the memory.

5. One or more non-transitory computer-readable media as recited in claim 1, wherein the particular user-specified communication rule directs the computing device to send the content element, or the information associated with the content element, to a specified email address, a mobile telephone number, a social networking site, a blogging service, or a micro-blogging service.

6. One or more non-transitory computer-readable media as recited in claim 1, further storing computer-executable instructions that, when executed, cause the one or more processors to perform acts comprising:
after the storing of the content element, receiving a request from a user to access the content element stored in the storage location, the request being accompanied by the transaction phrase token and a password;
determining if the transaction phrase token is associated with the password; and
in response to determining that the transaction phrase token is associated with the password, granting the user access to the content element stored in the storage location.

7. One or more non-transitory computer-readable media storing computer-executable instructions that, when executed by one or more processors of a computing device, cause the one or more processors to perform acts comprising:
receiving, at the computing device, a plurality of phrases, individual ones of the plurality of phrases being associated with one or more user-specified communication rules identifying different sets of one or more destination computer devices that are external to the computing device;
storing the plurality of phrases and the one or more user-specified communication rules in a memory of the computing device;
receiving, at the computing device from a user device over a network, a message having a syntax that includes a phrase, a user created content category, and a piece of content or an identification of the piece of content;
interpreting the message to extract the phrase, the user created content category, and the piece of content or the identification of the piece of content;
identifying, in the memory, the phrase within the plurality of phrases;
determining that the piece of content or the identification of the piece of content is associated with one of a plurality of storage categories that are associated with a first combination of the phrase and the user created content category;
identifying, from the memory, a particular user-specified communication rule that is associated with a second combination of the phrase and a storage category of the plurality of storage categories associated with the piece of content or the identification of the piece of content; and
causing the piece of content, the identification of the piece of content, or information associated with the piece of content, to be sent over the network to the one or more destinations identified by the particular user-specified communication rule.

8. One or more non-transitory computer-readable media as recited in claim 7, wherein the phrase is associated with a specific user account maintained in memory by the computing device, and further storing computer-executable instructions that, when executed perform an act comprising determining that the phrase is associated with the specific user account before the determining of the particular user-specified communication rule.

9. One or more non-transitory computer-readable media as recited in claim 7, wherein the computing device maintains multiple user accounts, each being associated with at least one unique phrase of the plurality of phrases.

10. One or more non-transitory computer-readable media as recited in claim 7, wherein the piece of content or the identification of the piece of content comprises a string of text, a link, a web page, an image or a video.

11. One or more non-transitory computer-readable media as recited in claim 7, wherein the particular user-specified communication rule directs the computing device to send the piece of content, the identification of the piece of content, or the information associated with the piece of content, to a specified email address, a mobile telephone number, a social networking site, a blogging service, or a micro-blogging service.

12. One or more non-transitory computer-readable media as recited in claim 7, wherein the computing device receives the message over the network via one of multiple communication methods, and wherein the particular user-specified communication rule identifies the one or more destinations based at least in part on an identity of the particular communication method through which the message is received.

13. One or more non-transitory computer-readable media as recited in claim 12, wherein the particular communication method comprises an email, a short messaging service (SMS) text message, a multimedia messaging service (MMS) message, or a voicemail.

14. One or more non-transitory computer-readable media as recited in claim 7, wherein the message further includes an identification of a destination to send the piece of content, the identification of the piece of content, or the information associated with the piece of content, and wherein the particular user-specified communication rule directs the computing device to send the piece of content, the identification of the piece of content, or the information associated with the piece of content, to the destination identified in the message.

15. One or more non-transitory computer-readable media as recited in claim 7, wherein a same user is associated with the phrase and with at least one of the one or more destinations identified by the user-specified communication rule, and wherein the particular user-specified communication rule alters at least one of the one or more destinations based at least in part on a time of day that the computing device receives the message.

16. One or more non-transitory computer-readable media as recited in claim 7, wherein a same user is associated with the phrase and with at least one of the one or more destinations identified by the particular user-specified communication rule, and wherein the particular user-specified communication rule alters at least one of the one or more specified destinations based at least in part on a communication method through which the computing device receives the message.

17. One or more non-transitory computer-readable media as recited in claim 1, wherein the storage location is a folder created in association with an account.

18. One or more non-transitory computer-readable media as recited in claim 17, wherein the folder is created by a user of the account to store personal content related to tasks.

19. A method comprising:
receiving, at a computing device, a plurality of phrase tokens, individual ones of the plurality of phrase tokens being associated with one or more user-specified rules identifying different storage locations in memory of the computing device or different sets of one or more destination computing devices that are external to the computing device, at least one of the one or more destination computing devices being a particular global positioning system (GPS) device;
storing the plurality of transaction phrase tokens and the one or more user-specified rules in the memory of the computing device;
receiving, at the computing device from a user device over a network, a message having a syntax including a phrase token, a user-specified content type indicator, and a content element;
interpreting, by the computing device, the message to extract the phrase token, the user-specified content type indicator, and the content element, wherein the content element includes physical location data;
identifying, in the memory, the phrase token within the plurality of phrase tokens;
identifying, in the memory, the one or more user-created rules associated with the phrase token;
determining, by the computing device based at least in part on the user-specified content type indicator, a particular user-created rule within the one or more user-created rules, the particular user-created rule identifying the particular GPS device as a destination computer device; and
forwarding, by the computing device, the content element to the GPS device based on the particular user-created rule.

20. The method as recited in claim 19, wherein the particular user-created rule specifies a network address of the GPS device.

21. The method as recited in claim 19, wherein the physical location data comprises a street address.

22. The method as recited in claim 19, wherein the user-specified content type indicator comprises a personal identification number, and the computing device authenticates a user based on the personal identification number.

* * * * *